United States Patent
Suzaki

(10) Patent No.: US 10,859,408 B2
(45) Date of Patent: Dec. 8, 2020

(54) OPTICAL FIBER SENSOR AND OPTICAL FIBER SENSOR SYSTEM

(71) Applicant: NEC CORPORATION, Tokyo (JP)

(72) Inventor: Tetsuyuki Suzaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 153 days.

(21) Appl. No.: 16/093,289

(22) PCT Filed: Mar. 29, 2017

(86) PCT No.: PCT/JP2017/013107
§ 371 (c)(1),
(2) Date: Oct. 12, 2018

(87) PCT Pub. No.: WO2017/179431
PCT Pub. Date: Oct. 19, 2017

(65) Prior Publication Data
US 2019/0120663 A1     Apr. 25, 2019

(30) Foreign Application Priority Data
Apr. 14, 2016   (JP) .................................. 2016-080768

(51) Int. Cl.
*G01D 5/34*    (2006.01)
*G01D 5/353*   (2006.01)
(Continued)

(52) U.S. Cl.
CPC .............. *G01D 5/344* (2013.01); *G01B 11/00* (2013.01); *G01B 11/26* (2013.01);
(Continued)

(58) Field of Classification Search
CPC .......... G01D 5/344; G01D 5/34; G01D 5/345; G01D 5/35351; G01D 5/35341;
(Continued)

(56) References Cited

U.S. PATENT DOCUMENTS 4,885,462 A * 12/1989 Dakin ................ G01D 5/35303
250/227.19
5,206,923 A * 4/1993 Karlsson ................ G01L 1/242
385/12
(Continued)

FOREIGN PATENT DOCUMENTS

CN           1477371 A    2/2004
CN         101074867 A   11/2007
(Continued)

OTHER PUBLICATIONS

Notification of First Office Action dated Nov. 28, 2019, issued by the China National Intellectual Property Administration in counterpart Application No. 201780023324.9.
(Continued)

*Primary Examiner* — John R Lee
(74) *Attorney, Agent, or Firm* — Sughrue Mion, PLLC

(57) ABSTRACT

An optical fiber changes a polarization state of a propagating light when at least one of a vibration and a displacement occurs. An optical transmitter inputs a first wavelength light to the optical fiber via a separator, and an optical transmitter inputs a second wavelength light to the optical fiber via a separator. The first and second wavelength lights propagated through the optical fiber in mutually opposite directions are respectively received by optical receivers (13 and 12) via the separators (18 and 17), and a fluctuation of a polarization is detected in polarization fluctuation detectors (16 and 15). A data processing device collects data indicating the fluctuation of the polarization detected by the polarization fluctuation detector and data indicating the fluctuation of the polarization detected by the polarization fluctuation detector.

20 Claims, 11 Drawing Sheets

(51) Int. Cl.
*H04B 10/25* (2013.01)
*G01B 11/26* (2006.01)
*G01B 11/00* (2006.01)
*H04B 10/07* (2013.01)
*H04B 10/58* (2013.01)
*H04B 10/61* (2013.01)

(52) U.S. Cl.
CPC ..... *G01D 5/35351* (2013.01); *G01D 5/35383* (2013.01); *H04B 10/07* (2013.01); *H04B 10/25891* (2020.05); *H04B 10/58* (2013.01); *H04B 10/6162* (2013.01)

(58) Field of Classification Search
CPC ............... G01D 5/35338; G01D 5/353; G01D 5/35383; G01D 5/35387; H04B 10/25891; H04B 10/2589; H04B 10/07; H04B 10/58; H04B 10/6162; H04B 10/616
See application file for complete search history.

(56) References Cited

U.S. PATENT DOCUMENTS

| | | | | |
|---|---|---|---|---|
| 6,211,962 | B1* | 4/2001 | Nolan | G01D 5/344 356/450 |
| 7,725,026 | B2* | 5/2010 | Patel | A61Q 19/00 398/16 |
| 2005/0147341 | A1 | 7/2005 | Patel et al. | |
| 2019/0120663 | A1* | 4/2019 | Suzaki | G01B 11/00 |

FOREIGN PATENT DOCUMENTS

| | | |
|---|---|---|
| CN | 103148795 A | 6/2013 |
| JP | 57-167688 A | 10/1982 |
| JP | 2000-048269 A | 2/2000 |
| JP | 2007-255966 A | 10/2007 |
| JP | 2008-203239 A | 9/2008 |

OTHER PUBLICATIONS

International Search Report for PCT/JP2017/013107 dated Jun. 20, 2017 [PCT/ISA/210].

* cited by examiner

OPTICAL FIBER SENSOR AND OPTICAL FIBER SENSOR SYSTEM

CROSS REFERENCE TO RELATED APPLICATIONS

This application is a National Stage of International Applications No. PCT/JP2017/013107 filed Mar. 29, 2017, claiming priority based on Japanese Patent Application No. 2016-080768, filed Apr. 14, 2016, the entire contents of which are hereby incorporated by reference.

TECHNICAL FIELD

The present disclosure relates to an optical fiber sensor and an optical fiber sensor system, more particularly, to an optical fiber sensor which detects at least one of a vibration and a displacement using an optical fiber, and an optical fiber sensor system including an optical fiber sensor of that kind.

BACKGROUND ART

Before now, various sensors using an optical fiber have been proposed. For example, Patent Literature 1 discloses an intrusion position detection device using an optical fiber as a sensor. The intrusion position detection device disclosed in Patent Literature 1 includes a first optical fiber and a second optical fiber arranged adjacent to each other in an area to be monitored. The first optical fiber and the second optical fiber respectively cause a fluctuation of a polarization in a propagated light in response to an external force.

In the intrusion position detection device disclosed in Patent literature 1, a light source is arranged at one end of the first optical fiber and a polarization fluctuation detector is arranged at the other end of the first optical fiber. On the other hand, a polarization fluctuation detector is arranged at one end of the second optical fiber and a light source is arranged at the other end of the second optical fiber. In the area to be monitored, the first optical fiber and the second optical fiber propagate lights in mutually opposite directions.

In the area to be monitored, when an external force is applied to the first optical fiber and the second optical fiber, a polarization fluctuation occurs in the light propagated through the first optical fiber and the light propagated through the second optical fiber, respectively. The polarization which occurred in the light propagated through the first optical fiber is detected by the polarization fluctuation detector (first polarization fluctuation detector) arranged at the other end of the first optical fiber. On the other hand, the polarization which occurred in the light propagated through the second optical fiber is detected by the polarization fluctuation detector (second polarization detector) arranged at one end of the second optical fiber. In the intrusion position detection device disclosed in Patent Literature 1, by detecting the polarization fluctuation in both polarization fluctuation detectors, it is possible to detect that an external force is applied in the area to be monitored In addition, in the intrusion position detection device disclosed in Patent Literature 1, the propagating direction of the light in the first optical fiber is opposite to that of the light propagated in the second optical fiber, and thus a distance from an end at which the polarization fluctuation detector is arranged to a portion to which an external force is applied in the first optical fiber is different from that in the second optical fiber. Due to this difference in distances, a timing difference occurs between the timing when the polarization fluctuation is detected in the first polarization fluctuation detector and the timing when the polarization fluctuation is detected in the second fluctuation detector. By using this timing difference, the intrusion position detection device disclosed in Patent Literature 1 can identify a portion (position) to which an external force is applied in the area to be monitored.

Here, in the intrusion position detection device disclosed in Patent Literature 1, two optical fibers, the first optical fiber and the second optical fiber, are used. The polarization fluctuation, which occurs in the light propagated through the optical fiber when an external force such as a vibration or an impact is applied to the optical fiber, may be different in the first optical fiber from that in the second optical fiber. In that case, the temporal fluctuation (waveform) of the polarization detected in the first polarization detector is different from that detected in the second polarization detector. When the waveform indicating the polarization fluctuation detected in the first polarization fluctuation detector is different from that detected in the second polarization detector, it is difficult to accurately acquire the above timing difference, and thus the identification of the position becomes difficult.

For overcoming the above mentioned problem, Patent Literature 2 discloses an optical fiber sensor in which lights are bidirectionally propagated in a single optical fiber. In the optical fiber disclosed in Patent Literature 2, a polarized light output from a polarized light source is divided into two by an optical divider. The polarized lights divided into two are respectively guided to both ends of an optical fiber and are input to the optical fiber in opposite directions from both ends. The optical fiber disclosed in Patent Literature 2 includes separators at both ends of the optical fiber, and lights propagated through the optical fiber in mutually opposite directions pass the separators and are respectively detected by photodetectors arranged at one end and the other end of the optical fiber.

In the optical fiber sensor disclosed in Patent Literature 2, a singular point of a detection signal of the photodetector arranged at the one end of the optical fiber and a singular point of a detection signal of the photodetector arranged at the other end of the optical fiber are respectively detected, and the temporal difference (timing difference) between them is measured. In the optical fiber sensor disclosed in Patent Literature 2, since two direction lights are propagated through a single optical fiber, it is possible to cause the same polarization fluctuation for both lights, unlike in Patent Literature 1. In the optical fiber sensor disclosed in Patent Literature 2, since similar singular points appear in the detection signals of both photodetectors, it is possible to accurately acquire the above timing difference, and thus accurate position identification becomes possible.

CITATION LIST

Patent Literature

Patent Literature 1: Japanese Unexamined Patent Application Publication No. 2000-48269
Patent Literature 2: Japanese Unexamined Patent Application Publication No. 2008-203239

SUMMARY OF INVENTION

Technical Problem

In Patent Literature 2, a polarized light output from a polarized light source is divided into two and the divided polarized lights are input to an optical fiber in opposite directions from both ends. Accordingly, two polarized lights of the same wavelength are propagated through the optical fiber in mutually opposite directions in Patent Literature 2. When lights of the same wavelength are propagated through an optical fiber in mutually opposite directions, the coherent beat noise, which is not controllable, occurs in both lights. It is conceivable that the polarization fluctuation cannot be detected correctly due to the influence of the coherent beat noise, and thus the accuracy of the position identification is deteriorated.

The present disclosure has been made in view of the aforementioned circumstances, and aims to provide an optical fiber sensor capable of propagating two lights in mutually opposite directions through a single optical fiber while making it less susceptible to noise, and an optical fiber sensor system including an optical fiber sensor of that kind.

Solution to Problem

In order to accomplish the aforementioned object, the present disclosure provides an optical fiber sensor system comprising:

an optical fiber sensor including:
an optical fiber configured to change a polarization state of a propagating light when at least one of a vibration and a displacement occurs;
a first optical transmitter arranged at one end of the optical fiber and configured to input a first wavelength light to the optical fiber;
a first optical receiver arranged at other end of the optical fiber and configured to receive the first wavelength light propagated through the optical fiber in a first direction from the one end toward the other end;
a first polarization fluctuation detector configured to detect a fluctuation of a polarization of a light received by the first optical receiver;
a second optical transmitter arranged at the other end of the optical fiber and configured to input a second wavelength light to the optical fiber;
a second optical receiver arranged at the one end of the optical fiber and configured to receive the second wavelength light propagated through the optical fiber in a second direction opposite to the first direction;
a second polarization fluctuation detector configured to detect a fluctuation of a polarization of a light received by the second optical receiver;
a first separator arranged between the one end of the optical fiber and the first optical transmitter and the second optical receiver, and configured to input the first wavelength light output from the first optical transmitter to the optical fiber and to cause the second optical receiver to receive the second wavelength light propagated through the optical fiber in the second direction; and
a second separator arranged between the other end of the optical fiber and the second optical transmitter and the first optical receiver, and configured to input the second wavelength light output from the second optical transmitter to the optical fiber and to cause the first optical receiver to receive the first wavelength light propagated through the optical fiber in the first direction, and
a data processing device configured to collect a first polarization fluctuation data indicating a fluctuation of a polarization detected in the first polarization fluctuation detector and a second polarization fluctuation data indicating a fluctuation of a polarization detected in the second polarization fluctuation detector.

Further, the present disclosure provides an optical fiber sensor comprising:

an optical fiber configured to change a polarization state of a propagating light when at least one of a vibration and a displacement occurs;
a first optical transmitter arranged at one end of the optical fiber and configured to input a first wavelength light to the optical fiber;
a first optical receiver arranged at other end of the optical fiber and configured to receive the first wavelength light propagated through the optical fiber in a first direction from the one end toward the other end;
a first polarization fluctuation detector configured to detect a fluctuation of a polarization of a light received by the first optical receiver;
a second optical transmitter arranged at the other end of the optical fiber and configured to input a second wavelength light to the optical fiber;
a second optical receiver arranged at the one end of the optical fiber and configured to receive the second wavelength light propagated through the optical fiber in a second direction opposite to the first direction;
a second polarization fluctuation detector configured to detect a fluctuation of a polarization of a light received by the second optical receiver;
a first wavelength multiplexer/demultiplexer arranged between the one end of the optical fiber and the first optical transmitter and the second optical receiver, and configured to input the first wavelength light output from the first optical transmitter to the optical fiber and to cause the second optical receiver to receive the second wavelength light propagated through the optical fiber in the second direction;
a second wavelength multiplexer/demultiplexer arranged between the other end of the optical fiber and the second optical transmitter and the first optical receiver, and configured to input the second wavelength light output from the second optical transmitter to the optical fiber and to cause the first optical receiver to receive the first wavelength light propagated through the optical fiber in the first direction.

Advantageous Effects of Invention

It is possible for an optical fiber sensor and an optical fiber sensor system according to the present disclosure to propagate two lights in mutually opposite directions through a single optical fiber while making it less susceptible to noise.

DESCRIPTION OF EMBODIMENTS

Figure 1:
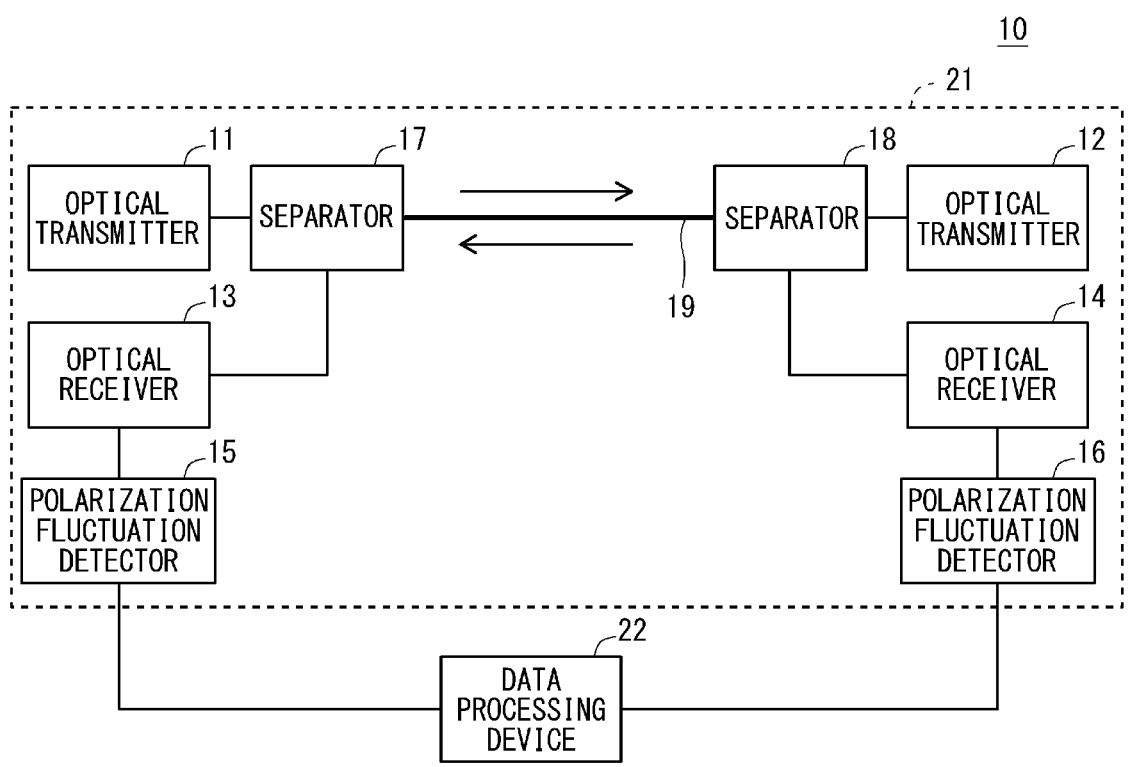
FIG. 1 is a block diagram showing an optical fiber sensor system according to present disclosure.

Prior to describing embodiments of the present disclosure, an overview of the present disclosure will be described. FIG. 1 shows an optical fiber sensor system according to the present disclosure. An optical fiber sensor system 10 includes am optical fiber sensor 21, a data processing device 22. The optical fiber sensor 21 includes optical transmitters 11 and 12, optical receivers 13 and 14, polarization fluctuation detectors 15 and 16, separators 17 and 18, and an optical fiber 19.

The optical fiber 19 is an optical fiber for propagating (guiding) a light, and an optical fiber which changes a polarization state of the propagating light when at least one of a vibration and a displacement occurs. In the optical fiber sensor 21, the optical transmitter 11, the optical receiver 13, the polarization fluctuation detector 15, and the separator 17 are arranged at one end of the optical fiber 19, and the optical transmitter 12, the optical receiver 14, the polarization fluctuation detector 16, and the separator 18 are arranged at the other end of the optical fiber 19.

The optical transmitter (first optical transmitter) 11 outputs a first wavelength light and inputs the first wavelength light to the optical fiber 19 from the one end of the optical fiber 19. The first wavelength light output from the first optical transmitter 11 is propagated in the optical fiber 19 in a direction (first direction) from the one end to the other end. The optical receiver (first optical receiver) 14 receives the light propagated in the optical fiber 19 in the first direction at the other end of the optical fiber 19. The polarization fluctuation detector (first polarization fluctuation detector) 16 detects a fluctuation of the polarization of the light received by the first optical receiver 14.

The optical transmitter (second optical transmitter) 12 outputs a second wavelength light, the wavelength of which is different from that of the first wavelength light, and input the second wavelength light to the optical fiber from the other end of the optical fiber 19. The second wavelength light output from the second optical transmitter 12 is propagated in the optical fiber 19 in a direction (second direction) from the other end to the one end. The optical receiver (second optical receiver) 13 receives the light propagated in the optical fiber 19 in the second direction at the one end of the optical fiber 19. The polarization fluctuation detector (second polarization fluctuation detector) 15 detects a fluctuation of the polarization of the light received by the second optical receiver 13.

The separator (first separator) 17 is arranged between the one end of the optical fiber 19 and the first optical transmitter 11 and the second optical receiver 13. The first separator 17 inputs the first wavelength light output from the first optical transmitter 11 to the optical fiber 19 and causes the second optical receiver 13 to receive the second wavelength light propagated through the optical fiber 19 in the second direction. The separator (second separator) 18 is arranged at the other end of the optical fiber 19 and the second optical transmitter 12 and the first optical receiver 14. The second separator 18 inputs the second wavelength light output from the second optical transmitter 12 to the optical fiber 19 and causes the first optical receiver 14 to receive the first wavelength light propagated through the optical fiber 19 in the first direction.

The data processing device 22 collects, from the first polarization fluctuation detector 16 and the second polarization fluctuation detector 15, data (polarization fluctuation data) indicating the fluctuation of the polarization detected by these detectors. The data processing device 22 collects the first polarization fluctuation data from the first polarization fluctuation detector 16 and collects the second polarization fluctuation data from the second polarization fluctuation detector 15. The data processing device 22 may identify a position at which at least one of the vibration and the displacement occurs in the optical fiber 19 based on the first polarization fluctuation data and the second polarization fluctuation data.

In the present disclosure, the optical fiber sensor 21 has the first optical transmitter 11 which outputs the first wavelength light at the one end of the optical fiber 19 and the second optical transmitter which outputs the second wavelength light at the other end of the optical fiber 19. In the optical fiber 21, the first wavelength light and the second wavelength light are propagated in the optical fiber 19 in mutually opposite directions. The first wavelength light propagated in the optical fiber 19 in the first direction is received by the first optical receiver 14 and the second wavelength light propagated in the second direction is received by the second optical receiver 13.

When an external force and or like is applied to the optical fiber 19 and at least one of a vibration and a displacement occurs in the optical fiber 19, the polarization state of the first wavelength light and the second wavelength light propagated in the optical fiber 19 respectively fluctuate, the polarization state of the lights received by the first optical receiver 14 and the second optical receiver 13 changes. By detecting this change in the polarization state using the first polarization fluctuation detector 16 and the second polarization fluctuation detector 15, it is possible to detect that at least one of the vibration and the displacement has occurred in a portion where the optical fiber 19 is laid. Further, by acquiring the time difference between the fluctuation of the polarization which has occurred in the light propagated in the first direction and the fluctuation of the polarization which has occurred in the light propagated in the second direction, it is possible to identify the position at which at least one of the vibration and the displacement have occurred.

In the optical fiber sensor 21 according to the present disclosure, the wavelength of the light propagated in the optical fiber 19 in the first direction is different from the wavelength of the light propagated in the optical fiber 19 in the second direction. Accordingly, it is possible to suppress the noise such as the coherent beat noise from being superimposed on the light propagated in the optical fiber. Therefore, when two lights are propagated in a single optical fiber in mutually opposite directions in the optical fiber sensor 21, it is possible to suppress the influence of the noise on the fluctuation of the polarization detected by the polarization detector.

Hereinafter, the embodiments of the present disclosure will be described in detail with reference to the drawings.

Figure 2:
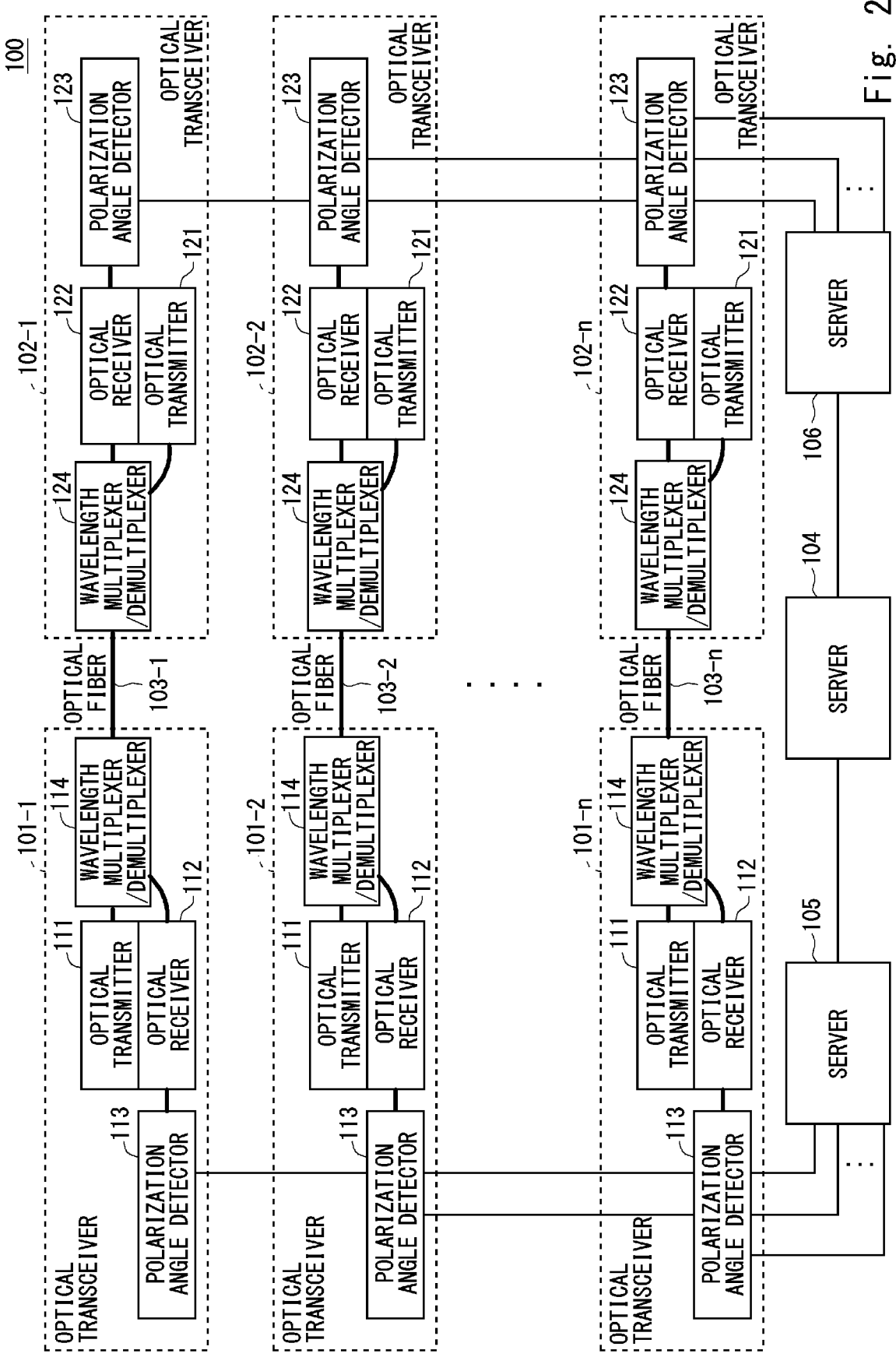
FIG. 2 is a block diagram showing an optical fiber sensor system according to a first embodiment of the present disclosure.

FIG. 2 shows an optical fiber sensor system according to a first embodiment of the present disclosure. The optical fiber sensor system 100 includes a plurality of optical transceivers (first optical transceivers) 101-1 to 101-$n$, a plurality of optical transceivers (second optical transceivers) 102-1 to 102-$n$, and a plurality of optical fibers 103-1 to 103-$n$, where n is an integer more than or equal to 2.

In the optical fiber sensor system 100, each set of the first optical transceivers 101-1 to 101-$n$, the second optical transceivers 102-1 to 102-$n$, and the optical fibers 103-1 to 103-$n$ composes an optical fiber sensor. In the following description, the plurality of the first optical transceivers 101-1 to 101-$n$, the plurality of the second optical transceivers 102-1 to 102-$n$, and the plurality of the optical fibers 103-1 to 103-$n$ may be collectively referred as the first optical transceiver 101, the second optical transceiver 102, and the optical fiber 103, when it is not necessary to specifically differentiate them.

The optical fiber 103 is an optical fiber for propagating a light therethrough, and changes the polarization state of the light propagated therethrough when at least one of a vibration and a displacement occurs. For example, a single mode optical fiber is used for the optical fiber 103.

The first optical transceiver 101 and the second optical transceiver 102 are configured as devices capable of transmitting an optical signal (emitting a light) and receiving an optical signal (receiving a light). The first optical transceiver 101 includes an optical transmitter 111, an optical receiver 112, a polarization angle detector 113, and a wavelength multiplexer/demultiplexer 114. The second optical transceiver 102 includes an optical transmitter 121, an optical receiver 122, a polarization angle detector 123, and a wavelength multiplexer/demultiplexer 124. The first optical transceiver 101 is arranged at one end of the optical fiber 103 and the second optical transceiver 102 is arranged at the other end of the optical fiber 103.

The optical transmitter (first optical transmitter) 111 included in the first optical transceiver 101 input a first wave length light to the optical fiber 103 from the one end of the optical fiber 103. The first optical transmitter 111 includes a light source which emits the first wavelength light. The first optical transmitter 111 includes, for example, a semiconductor laser emitting a linearly polarized laser light, the wavelength of which is the first wavelength. The semiconductor laser is configured as, for example, a CW (Continuous Wave) laser which emits a laser light with constant power. The first wavelength light output from the first optical transmitter 111 is propagated in the optical fiber 103 in a direction (first direction) from the one end to the other end.

The optical transmitter (second optical transmitter) 121 included in the second optical transceiver 102 inputs a second wavelength light to the optical fiber 103 from the other end of the optical fiber 103. The second wavelength is different from the first wavelength light. The second optical transmitter 121 includes a light source which emits the second wavelength light. The second optical transmitter 121 includes, for example, a semiconductor lager emitting a linearly polarized laser light, the wavelength of which is the second wavelength. The semiconductor laser is configured as, for example, a CW laser which emits a laser light with constant power. The second wavelength light output from the second transmitter 121 is propagated in the optical fiber 103 in a direction (second direction) from the other end to the one end.

The optical receiver (first receiver) 122 included in the second transceiver 102 receives the light propagated in the optical fiber 102 in the first direction at the other end of the optical fiber 103. The first optical receiver 122 includes, for example, two light detectors for detecting two polarized components orthogonal to each other, which are included in the received first wavelength light. The first optical receiver 122 includes, for example, a light detector (first polarization component detector) for detecting one polarization components (first polarization component) out of the polarization components orthogonal to each other and a light detector (second polarization component detector) for detecting the other polarization component (second polarization component). Each light detector outputs an electrical signal corresponding to the amount of the detected polarization component.

The polarization angle detector (first polarization angle detector) 123 detects an angle (polarization angle) of the polarization plane of the light received by the first optical receiver 122 as a fluctuation which occurred in the first wavelength light. The first polarization angle detector 123 detects the polarization angle, for example, based on the electrical signal corresponding to the amount of the first polarization component and the electrical signal corresponding to the amount of the second polarization component, which are output from the first optical receiver 122. The first polarization angle detector 123 may be configured as, for example, a DSP (digital signal processor) or an LSI (large-scale integrated circuit).

The optical receiver (second optical receiver) 112 included in the first optical transceiver 101 receives the light propagated in the optical fiber 103 in the second direction at the one end of the optical fiber 103. The first optical receiver 122 includes, for example, two light detectors for detecting two polarized components orthogonal to each other, which are included in the received second wavelength light. The second optical receiver 112 includes, for example, a light detector (third polarization component detector) for detecting one polarization components (third polarization component) out of the polarization components orthogonal to each other and a light detector (fourth polarization component detector) for detecting the other polarization component (fourth polarization component). Each light detector outputs an electrical signal corresponding to the amount of the detected polarization component.

The polarization angle detector (second polarization angle detector) 113 detects an angle (polarization angle) of the polarization plane of the light received by the second optical receiver 112 as a fluctuation which occurred in the second wavelength light. The second polarization angle detector 113 detects the polarization angle, for example, based on the electrical signal corresponding to the amount of the third polarization component and the electrical signal corresponding to the amount of the fourth polarization component, which are output from the second optical receiver 112. The first polarization angle detector 123 may be configured as, for example, a DSP or an LSI.

The wavelength multiplexer/demultiplexer (first wavelength multiplexer/demultiplexer) 114 included in the first optical transceiver 101 is arranged between the one end of the optical fiber 103 and the first optical transmitter 111 and the second optical receiver 112. The first wavelength multiplexer/demultiplexer 114 inputs the first wavelength light output from the first optical transmitter 111 to the optical fiber 103, and causes the second optical receiver 112 to receive the second wavelength light propagated through the optical fiber 103 in the second direction. For example, a wavelength division multiplex coupler (WDM coupler) is used for the first wavelength multiplexer/demultiplexer 114.

The wavelength multiplexer/demultiplexer (second wavelength multiplexer/demultiplexer) 124 included in the second optical transceiver 102 is arranged between the other end of the optical fiber 103 and the second optical transmitter 121 and the first optical receiver 122. The second wavelength multiplexer/demultiplexer 124 inputs the second wavelength light output from the second optical transmitter 121 to the optical fiber 103, and causes the first optical receiver 122 to receive the first wavelength light propagated through the optical fiber 103 in the first direction. For example, a WDM coupler is used for the first wavelength multiplexer/demultiplexer 114.

The server 106 collets, from the first polarization angle detector 123, data (first polarization angle data) indicating the angle of the polarization plane detected in the first polarization angle detector 123 as data indicating the fluctuation of the polarization which has occurred in the first wavelength light. The server 106 collects the first polarization angle data from the first polarization angle detector 123 included in each of the plurality of the second optical transceivers 102-1 to 102-n. The server 106 is connected to first polarization angle detector 123 included in each of the second optical transceivers 102 by a wired network or a wireless network, and collets the first polarization angle data through these networks.

The server 105 collets, from the second polarization angle detector 113, data (second polarization angle data) indicating the angle of the polarization plane detected in the second polarization angle detector 113 as data indicating the fluctuation of the polarization which has occurred in the second wavelength light. The server 105 collects the second polarization angle data from the second polarization angle detector 113 included in each of the plurality of the first optical transceivers 101-1 to 101-n. The server 104 collects the first polarization angle data and the second polarization angle data via the server 105 and server 106. The server 105 is connected to second polarization angle detector 113 included in each of the first optical transceivers 101 by a wired network or a wireless network, and collets the first polarization angle data through these networks.

It should be noted that the optical transmitter 111, the optical receiver 112, polarization angle detector 113, and the wavelength multiplexer/demutiplexer 114, which are included in the first optical transceiver 101, respectively correspond to the first optical transmitter 11, the second optical receiver 13, the polarization fluctuation detector 15, and the separator 17, which are shown in FIG. 1. The optical transmitter 121, the optical receiver 122, polarization angle detector 123, and the wavelength multiplexer/demultiplexer 124, which are included in the second optical transceiver 102, respectively correspond to the second optical transmitter 12, the first optical receiver 14, the polarization fluctuation detector 16, and the separator 18, which are shown in FIG. 1.

Figure 3:
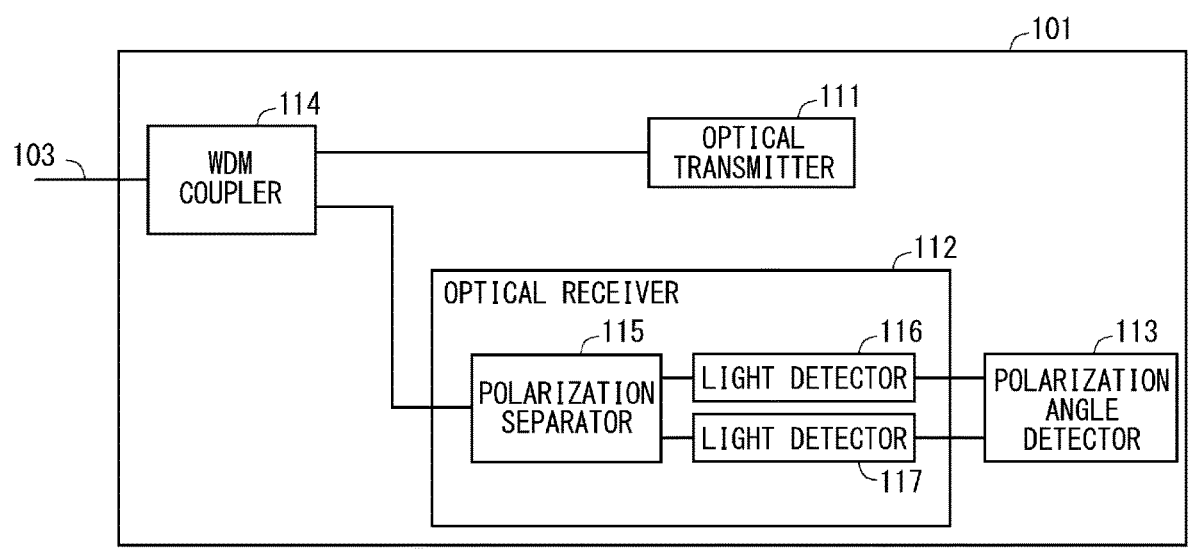
FIG. 3 is a block diagram showing a detailed configuration of a first optical transceiver.

FIG. 3 shows a detailed configuration of the first optical transceiver 101. In the exemplary configuration shown in FIG. 3, the first wavelength multiplexer/demultiplexer 114 is configured by a WDM coupler. The first wavelength multiplexer/demultiplexer (WDM coupler) 114 includes a first port connected to the one end of the optical fiber 103, a second port connected to the first optical transmitter 111, and a third port connected to the second optical receiver 112. The WDM coupler 114 passes the first wavelength light from the second port to the first port and passes the second wavelength light from the first port to the third port.

The second optical receiver 112 includes a polarization separator 115 and light detectors 116 and 117. The polarization separator 115 separates the light input therein into light components in two polarization direction orthogonal to each other. The polarization separator 115 branches the light component in one polarization direction (third polarization direction) included in the second wavelength light propagated through the optical fiber 103 to the light detector 116, and branches the light component in the other polarization direction (fourth polarization component) to the light detector 117. The polarization separator 115 includes, for example, a polarization beam splitter which transmits one of the light in the third polarization direction and the light in the fourth polarization direction and reflects the other of the lights.

The light detector 116 (third polarization component detector) detects the light component of the second wavelength light in the third polarization direction, which is input thereto via the polarization separator 115. The light detector 117 (fourth polarization component detector) detects the light component of the second wavelength light in the fourth polarization direction, which is input thereto via the polarization separator 115. The light detectors 116 and 117 include, for example, an optical/electrical conversion element such as a PD (photodetector) element.

The second polarization angle detector 113 detects the rotation of the polarization plane of the second wavelength light propagated through the optical fiber 103 based on the light component in the third polarization direction detected by the light detector 116 and the light component in the fourth polarization direction detected by the light detector 117. The second polarization angle detector 113 detects the rotation of the polarization plane, for example, based on the ratio of light component in the third polarization direction detected by the light detector 116 to the light component in the fourth polarization direction detected by the light detector 117.

The configuration of the second optical transceiver 102 is the same as the configuration of the first optical transceiver 101 shown in FIG. 3. A WDM coupler (corresponding to the polarization multiplexer/demultiplexer 124 shown in FIG. 2) included in the second optical transceiver 102 includes a port (fourth port) connected to the other end of the optical fiber 103, a port (fifth port) connected to the second optical transmitter 121, and a port (sixth port) connected to the first optical receiver 122. This WDM coupler passes the first wavelength light from the fourth port to the sixth port and passes the second wavelength light from the fifth port to the fourth port.

The first optical receiver 122 included in the second optical transceiver 102 includes a polarization separator and two light detectors, similar to the second optical receiver 112 shown in FIG. 3. The polarization separator included in the second optical receiver 112 separates the first wavelength light propagated through the optical fiber 103 into two polarization directions orthogonal to each other. This polarization separator branches the light component in one polarization direction (first polarization direction) to one of the two light detectors and branches the light component in the other polarization direction (second polarization component) to the other of the two light detectors. The polarization separator includes, for example, a polarization beam splitter which transmits one of the light in the first polarization direction and the light in the second polarization direction and reflects the other of the lights.

One light detector (first polarization component detector) out of the two light detectors included in the first optical receiver 122 detects the light component of the first wavelength light in the first polarization direction, which is input thereto via the above-mentioned polarization separator. The other light detector (second polarization component detector) detects the light component of the first wavelength light in the second polarization direction, which is input thereto via the above-mentioned polarization separator. These light detectors include, for example, an optical/electrical conversion element such as a PD element.

The first polarization angle detector 123 detects the rotation of the polarization plane of the first wavelength light propagated through the optical fiber 103 based on the light component in the first polarization direction detected by the light detector 116 and the light component in the second polarization direction detected by the light detector 117. The first polarization angle detector 123 detects the rotation of the polarization plane based on, for example, the ratio of the light component in the first polarization direction detected by the above first polarization component detector to the light component in the second polarization direction detected by the above second polarization component detector.

Figure 4:
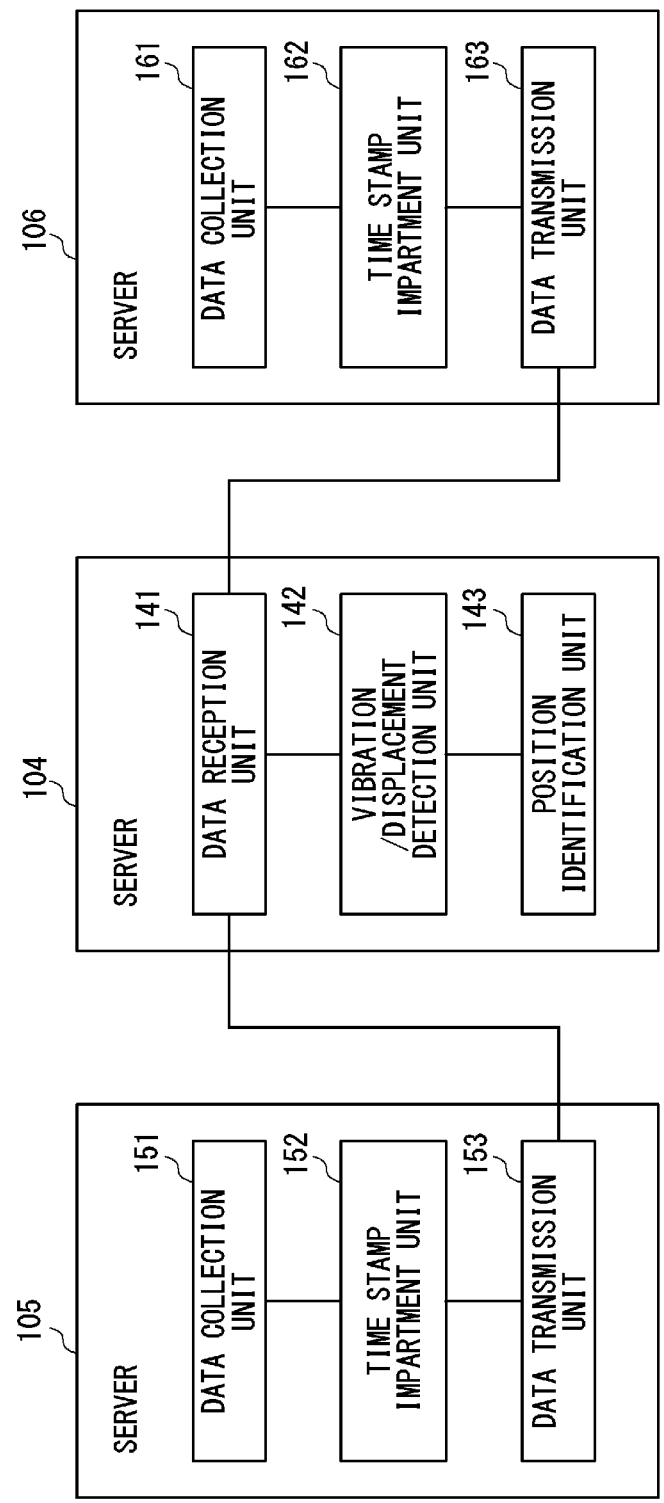
FIG. 4 is a block diagram showing a configuration of a server.

FIG. 4 shows a configuration of a server. The servers 104 to 106 typically configured as a computer apparatus including a CPU (central processing unit), a memory, and an auxiliary storage device. At least a portion of the functions of the servers 104 to 106 may implemented by the CPU operating in according with a predetermined program. The server 104 and the servers 105 and 106 are mutually connected, for example via a wired network or a wireless network, and thus communication is possible between the server 104 and the server 105, and between the server 104 and the server 106.

The servers 104 to 106 correspond to the data processing device 22 shown in FIG. 1. It should be noted that although an example in which the data processing device is configured by three servers is illustrated FIG. 2 and FIG. 4, the present disclosure is not limited thereto. In the optical fiber sensor system 100 according to the present embodiment, it is possible to employ a configuration in which one server includes functions of the server 104 to 106.

The server 106, which is a first data processing device, includes a data collection unit 161, a timestamp impartment unit 162, and a data transmission unit 163. The data collection unit (data collection means) 161 collects the first polarization angle data from the first polarization angle detector 123 included in each of the second optical transceivers 102-1 to 102-$n$. The timestamp impartment unit (timestamp impartment means) 162 imparts a timestamp to the first polarization angle data collected by the data collection unit 161.

The data transmission unit (data transmission means) 163 transmits the first polarization angle data to the server 104. The server 104 and the server 106 are connected via, for example, a wired network or a wireless network, and the data transmission unit 163 transmits the first polarization angle data to the server 104 via such networks.

For example, the data transmission unit 163 transmits, in real time, the first polarization angle data which varies from moment to moment to the server 104. Alternatively, when the first polarization angle data collected by the data collection unit 161 is stored in a not shown storage device, the data transmission unit 163 may read out the first polarization angle data in a predetermined time period from the storage device and transmit the first polarization angle data to the server 104. Further, the data transmission unit 163 may determine whether the change in the first polarization angle data is greater than or equal to a threshold value. When it is determined that the first polarization angle data is greater than or equal to the threshold value, the data transmission unit 163 may transmit, to the server 104, the first polarization angle data in a predetermined time period including before and after the change.

The server 105, which is a second data processing device, includes a data collection unit 151, a timestamp impartment unit 152, and a data transmission unit 153. The functions of the data collection unit 151, the timestamp impartment unit 152, and the data transmission unit 153 are similar as the functions of the data collection unit 161, the timestamp impartment unit 162, and the data transmission unit 163 in the server 106, except that data is changed from the first polarization angle data to the second polarization angle data. That is to say, the data collection unit 151 collects the second polarization angle data from the second polarization angle detector 113 included in each of the first optical transceivers 101-1 to 101-$n$. The timestamp impartment unit 152 imparts a timestamp to the second polarization angle data collected by the data collection unit 151. The data transmission unit 153 transmits the second polarization angle data to the server 104.

The sever 104, which is a third data processing device, includes a data reception unit 141, a vibration/displacement detection unit 142, and a position identification unit 143. The data reception unit (data reception means) 141 receives the first polarization angle data from the server 106 and receives the second polarization angle data from the sever 105. The vibration/displacement detection unit (vibration/displacement detection means) 142 detect the occurrence of at least one of a vibration and a displacement in the optical fiber 103 based on at least one of the first polarization angle data and the second polarization angle data received by the data reception unit 141.

The position identification unit (position identification means) 143 identifies the position at which at least one of the vibration and the displacement occurs in the optical fiber 103 based on a difference between the detection timing of the at least one of the vibration and the displacement detected based on the first polarization angle data and the detection timing of the at least one of the vibration and the displacement detected based on the second polarization angle data. The difference of the detection timings can be obtained from the timestamp imparted to the first polarization angle data and the timestamp imparted to the second polarization angle data.

Figure 5:
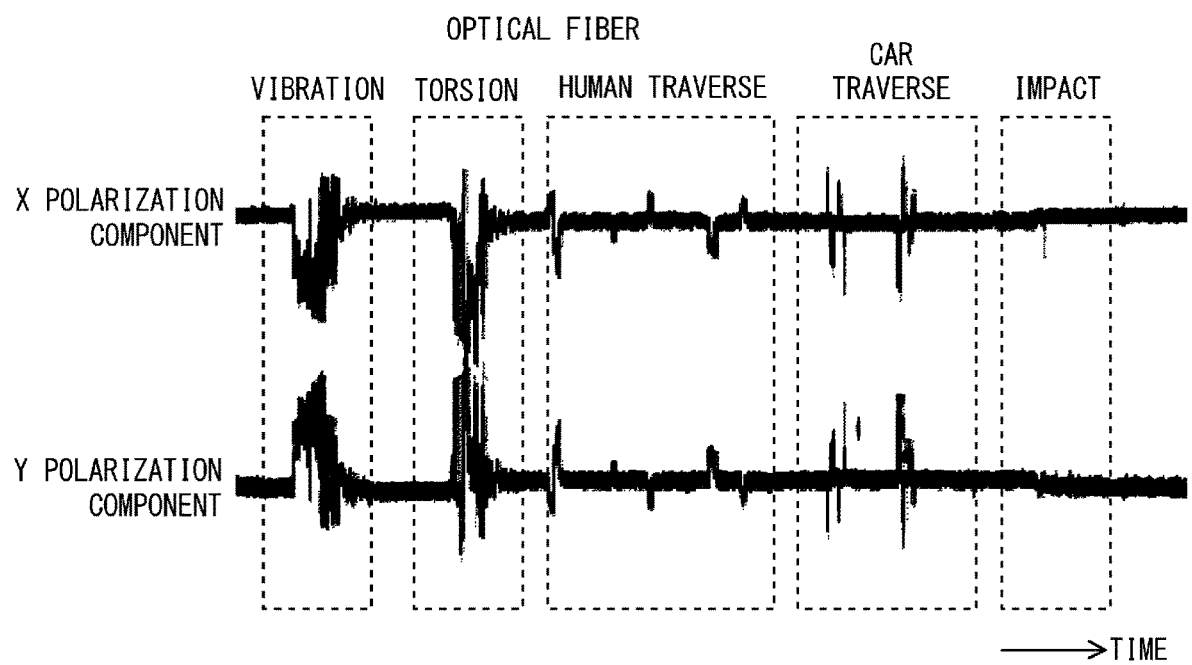
FIG. 5 is a waveform diagram showing detection signals of two polarization components orthogonal to each other.

FIG. 5 shows an example of signal waveforms of one polarization component and the other polarization component in two mutually orthogonal polarization directions. In FIG. 5, signal waveforms of the signals output from the light detector 116 and light detector 117 (refer to FIG. 3) when an external force is applied to the optical fiber 103 laid on a floor are shown. For example, when the optical fiber 103 is shaken or twisted, the polarization state of the light propagated through the optical fiber 103 will be changed. Further, when a human or a car cross over the optical fiber 103, or when an impact is applied to the optical fiber 103, the polarization state of the light propagated through the optical fiber 103 will be changed.

When the polarization state of the light propagated through the optical fiber 103 is changed, a ratio between one polarization component (X polarization component) of the linearly polarized light input from the optical transmitter to the optical fiber 103 detected by the light detector 116 and the other polarization component (Y polarization component) detected by the light detector 117 is changed. For example, as shown in FIG. 5, when the X polarization component is decreased, the Y polarization component is increased. In server 104, it is possible to detect a fluctuation of the polarization angle by examining the ratio between the X polarization component and the Y polarization component, and the above-mentioned matter can be detected.

Figure 6:
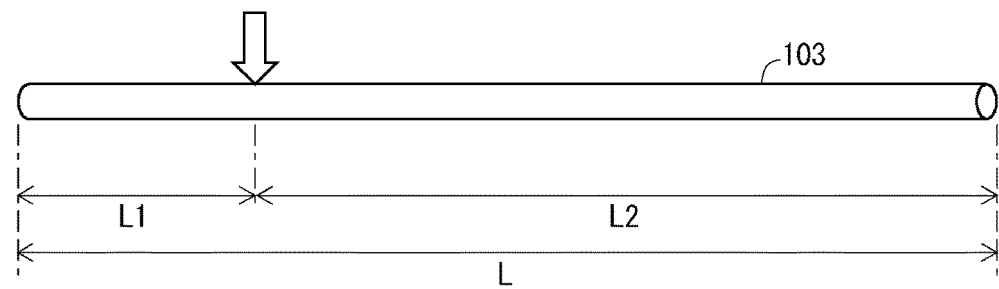
FIG. 6 is a diagram showing the relationship between an optical fiber and a position where an external force is applied.

FIG. 6 shows the relationship between the optical fiber 103 and a position where an external force is applied. It is assumed that the distance (total length) from one end to other end of the optical fiber 103 is L. In the optical fiber 103, it is assumed that an external force is applied to a position at a distance L1 from the one end, and a vibration, a displacement, or the like occurs. The distance L2 between the position where an external force is applied to the optical fiber 103 and the other end of the optical fiber 103 is represented by L2=L−L1.

The speed of the light propagated through the optical fiber has a finite value, and the second polarization angle detector 113 (refer to FIG. 2) arranged at the one end of the optical fiber 103 detects a fluctuation of the polarization angle at a timing delayed by a time required for the light to travel the distance L1 from the timing when an external force is applied. On the other hand, the first polarization angle detector 123 arranged at the other end of the optical fiber 103 detects a fluctuation of the polarization angle at a timing delayed by a time required for the light to travel the distance L2 from the timing when the external force is applied. The position identification unit 143 (refer to FIG. 4) can identify the position where the external force is applied to the optical fiber 103 based on the total length of the optical fiber 103 and the timing difference at which the fluctuation of the polarization angle is detected by the two polarization angle detectors.

In the present embodiment, the first optical transmitter 111 which outputs the first wavelength light is arranged at the one end of the optical fiber 103 and the second optical transmitter 121 which outputs the second wavelength light is arranged at the other end of the optical fiber 103. The first wavelength light and the second wavelength light are propagated through the optical fiber 103 in mutually opposite directions. The first wavelength light is received by the first optical receiver 122 arranged at the other end of the optical fiber 103 and the second wavelength light is received by the second optical receiver 112 arranged at the one end of the optical fiber 103. The optical fiber 103 changes the polarization state of the propagating light when at least one a vibration and a displacement occurs. By detecting this change in the polarization state by the first polarization angle detector 123 and the second polarization angle detector 113, it is possible to detect that at least one of the vibration and the displacement occurs in the optical fiber 103. Further, it is possible to identify the position where the at least one of the vibration and the displacement occurs based on the detection timing difference between the first polarization angle detector 123 and the second polarization angle detector 113.

In the present embodiment, in particular, the wavelength of the light propagated in the first direction from the one end to the other end in the optical fiber 103 is different from the wavelength of the light propagated in the second direction from the other end to the one end in the optical fiber 103. Accordingly, in the optical fiber sensor according to the present embodiment, the coherent beat noise, which is problematic when the configuration of the Patent Literature 2 is employed, is not generated. Therefore, it is possible for the optical fiber sensor according to the present embodiment to suppress the influence of the noise compared to the optical fiber sensor disclosed in Patent Literature 2. In the optical fiber sensor according to the present embodiment, by suppressing the influence of the noise, it is possible to more accurately detect the fluctuation of the polarization than the optical fiber sensor disclosed in the Patent Literature 2, and it is possible to more accurately acquire the difference between the detection timing in the first polarization angle detector 123 and the detection timing in the second polarization angle detector 113 than the optical fiber sensor disclosed in the Patent Literature 2.

Figure 7:
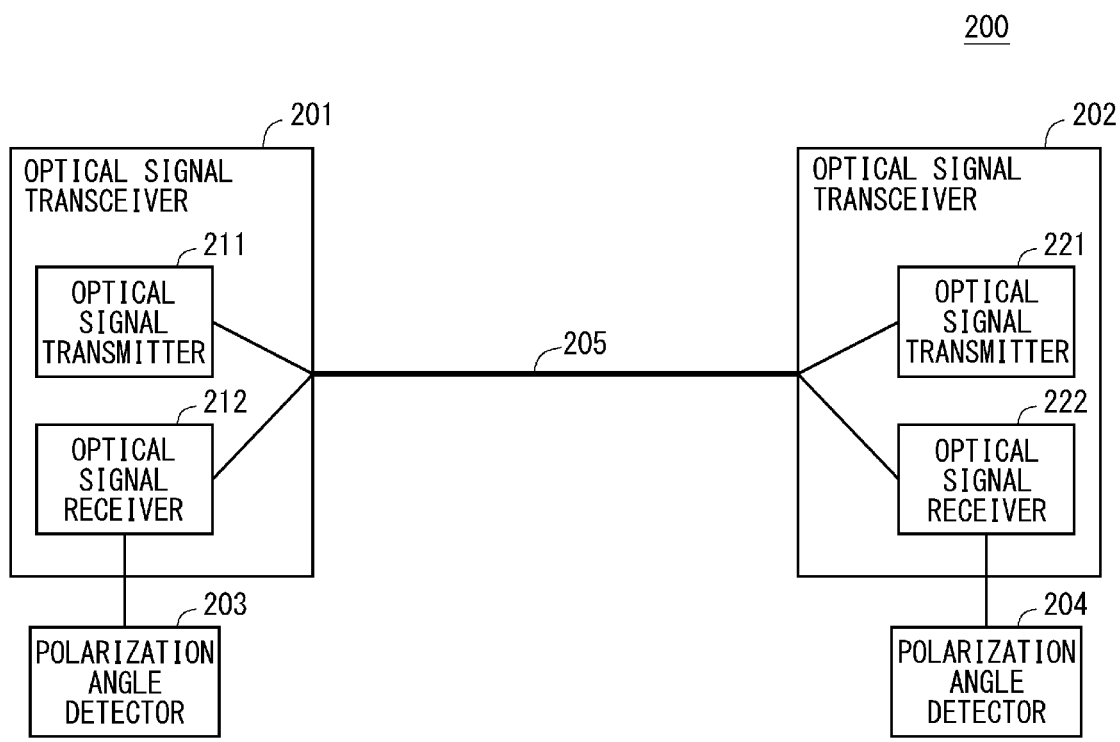
FIG. 7 is a block diagram showing an optical fiber sensor according to a second embodiment of the present disclosure.

Next, a second embodiment of the present disclosure will be described. FIG. 7 shows an optical fiber sensor according to the second embodiment of the present disclosure. The optical fiber sensor 200 according to the present embodiment includes optical signal transceivers 201 and 202, polarization angle detectors 203 and 204, and an optical fiber 205. The optical fiber sensor 200 shown in FIG. 7 may be used as at least a portion of plurality of optical fiber sensors included in the optical fiber sensor system 100 shown in FIG. 2. It should be noted that separators corresponding to the wavelength multiplexers/demultiplexers 114 and 124 shown in FIG. 2 are not shown in FIG. 7.

In the present embodiment, the optical fiber 205 used in the optical fiber sensor 200 may further serve as an optical fiber used in an optical signal transmission system for transmitting and receiving optical signals. In other words, an optical fiber used for transmitting and receiving optical signals in an optical signal transmission system may be used in the optical fiber sensor 200. The optical signal transmission system may be a system, for example, in which polarization multiplexed optical signals are transmitted and received using the digital coherent optical communication system.

In the optical fiber 200 according to the present embodiment, the optical signal transceiver (first optical signal transceiver) 201 arranged at one end of the optical fiber 205 includes an optical signal transmitter 211 and an optical signal receiver 212. The optical signal transceiver 202 arranged at the other end of the optical fiber 205 includes an optical signal transmitter 221 and an optical signal receiver 222.

The optical signal transmitter (first optical signal transmitter) 211 included in the first optical transceiver 201 modulates the first wavelength light by a given modulation method according to data being transmitted to generate an optical signal (first optical signal), and causes the first optical signal to input to the one end of the optical fiber 205. The first optical signal output from the first optical signal transmitter 211 is propagated thorough the optical fiber 205 from the one end to the other end, and is received by the second optical signal transceiver 202 arranged at the other end of the optical fiber 205. The optical signal receiver (first optical signal receiver) 222 included in the second optical signal transceiver 202 receives the first optical signal and demodulates the transmitted data using a demodulation method corresponding to the modulation method of the transmitter side.

The optical signal transmitter (second optical signal transmitter) 221 included in the second optical signal transceiver 202 modulates the second wavelength light by a given modulation method according to data being transmitted to generate an optical signal (second optical signal), and causes the second optical signal to input the other end of the optical fiber 205. The second optical signal output from the second optical signal transmitter 221 is propagated through the optical fiber 205 from the other end to the one end, and is received by the first optical signal transceiver 201 arranged at the one end of the optical fiber 205. The optical signal receiver (second optical signal receiver) 212 included in the first optical signal transceiver 201 receives the second optical signal and demodulates the transmitted data using a demodulation method corresponding to the modulation method of the transmitter side.

In the present embodiment, the first optical signal transmitter 201 (the first optical signal transmitter 211 and the second optical signal receiver 212 included therein) may be used as the first optical transmitter 111 and the second optical receiver 112 (refer to FIG. 2). Further, the second optical signal transceiver 202 (the second optical signal transmitter 221 and the first optical signal receiver 222) may be used as the second optical transmitter 121 and the first optical receiver 122. The first optical signal transmitter 211 and the second optical signal transmitter 221 may enter linearly polarized continuous waves into the optical fiber 205 without performing the modulation according to data being transmitted. Further, the first optical signal receiver 222 and the second optical signal receiver 212 may respectively detect the intensity of the light components in polarization directions orthogonal to each other of the first optical signal and the second optical signal without performing the demodulation.

The polarization angle detector (first polarization angle detector) 204 detects an angle of the polarization plane of the first optical signal based on the light components in the polarization directions orthogonal to each other of the first optical signal detected by the first optical signal receiver 222. The polarization angle detector (second polarization angle detector) 203 detects an angle of the polarization plane of the second optical signal based on the light component in the polarization directions orthogonal to each other of the second optical signal detected by the second optical receiver 212. The first polarization angle detector 204 and the second polarization angle detector 203 respectively correspond to the first polarization angle detector 123 and the second polarization angle detector 113 shown in FIG. 2.

It should be noted that, although one first optical signal transceiver 201 and one second optical signal transceiver 202 are shown in FIG. 7, the optical fiber sensor 200 may include a plurality of the first optical signal transceivers 201 and a plurality of the second optical signal transceivers 202 at both ends of the optical fiber 205. In this case, a portion of the plurality of the first optical signal transceivers 201 may be used as the first optical transmitter 111 and the second optical receiver 112 for the optical fiber sensor, and a portion of the plurality of the second optical signal transceivers 202 may be used as the second optical transmitter 121 and the first optical receiver 122 for the optical fiber sensor. The rest of the first optical signal transceivers 201 and the rest of the second optical signal transceivers 202 may be used for transmitting and receiving the optical signals in the optical transmission system. For example, the optical signal transmission system may be configured as a system in which optical signals are transmitted by a plurality of channels using the wavelength division multiplexing method, and a portion of the plurality channels may be used for the optical fiber sensor 200.

In the present embodiment, the optical signal transmission system may be a system in in which polarization multiplexed optical signals are transmitted and received using the digital coherent optical communication system. In this case, the first optical signal receiver 222 and the second optical signal receiver 212 may be configured as digital coherent optical receivers. The digital coherent optical receiver typically includes: a polarization separation unit (polarization separation means) for separating the polarization multiplexed optical signal into two polarization components orthogonal to each other; an optical/electrical conversion unit (optical/electrical conversion means) for converting each separated polarization component into an electric signal; a signal conversion unit (signal conversion means) for converting the converted electric signal of each polarization component into a digital signal; and a digital signal processing unit (digital signal processing means) for performing a predetermined process including a polarization separation signal process for the digital signal. In the digital coherent optical receiver, in particular, portions of the polarization separation unit and the optical/electrical conversion unit may be used as the first optical receiver 122 and the second optical receiver 112 (refer to FIG. 2) for the optical fiber sensor.

Figure 8:
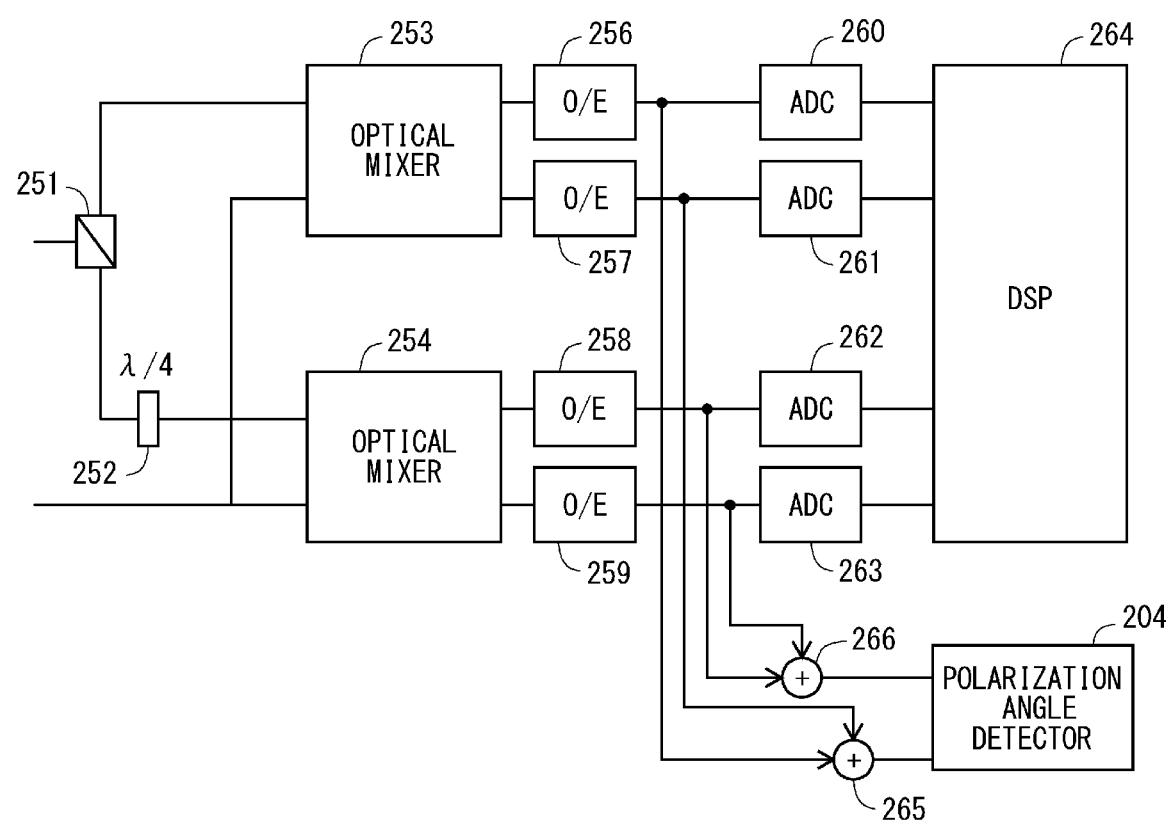
FIG. 8 is a block diagram showing an exemplary configuration of an optical signal receiver configured as a digital coherent optical receiver.

FIG. 8 shows an exemplary configuration of the first optical signal receiver 222 configured as a digital coherent optical receiver. Here, a case in which Dual Polarization-Quadrature Phase Shift Keying (DP-QPSK) is used as the modulation method of the optical signals in the optical signal transmission system is considered. The optical signal receiver 222 includes a polarization beam splitter 251, a ¼ wavelength plate 252, optical mixers 253 and 254, optical/electrical converters 256 to 259, an AD (analog to digital) converters 260 to 263, and a digital signal processing unit 264.

The polarization beam splitter 251 corresponds to the polarization separation unit and separates the polarization multiplexed optical signal of the first wavelength received through the optical fiber 205 (refer to FIG. 7) into two polarization components orthogonal to each other. That is, the polarization beam splitter 251 separates the polarization multiplexed optical signal into the X polarization component and the Y polarization component. The optical mixer 253 mixes the light of the X polarization component (the modulated signal lights of the X polarization) separated by the polarization beam splitter 251 with a local oscillation light. The optical mixer 254 mixes the light of the Y polarization component (the modulated signal light of the Y polarization) input therein via the ¼ wavelength plate with a local oscillation light. The optical mixer 253 outputs detection lights of the I component and the Q component of the modulated signal of the X polarization. The optical mixer 254 outputs detection lights of the I component and the Q component of the modulated signal light of the Y component.

The optical/electrical converters (O/E) 256 to 259 are the optical/electrical conversion units and convert lights into electrical signals. The optical/electrical converters 256 and 257 are optical/electrical converters corresponding to the X polarization component, and the optical/electrical converters 258 and 259 are optical/electrical converters corresponding to the Y polarization component. The optical/electrical converter 256 converts the detection lights of the I component of the X polarization into electrical signals, and the optical/electrical converter 257 converts the detection light of the Q component of the X polarization into electrical signals. The optical/electrical converter 258 converts the detection lights of the I component of the Y polarization into electrical signals, and the optical/electrical converter 259 converts the detection lights of the Q component of the Y polarization into electrical signals.

An adder 265 adds the electrical signal corresponding to the detection light of the I component of the X polarization output from the optical/electrical converter 256 and the electrical signal corresponding to the detection light of the Q component of the X polarization output from the optical/electrical converter 257. An adder 266 adds the electrical signal corresponding to the detection light of the I component of the Y polarization output from the optical/electrical converter 258 and the electrical signal corresponding to the detection light of the Q component of the Y polarization output from the optical/electrical converter 259.

The adder 265 outputs the electrical signal corresponding to the X polarization component included in the polarization multiplexed optical signal to the polarization angle detector 204. The electrical signal output from the adder 265 corresponds to the electrical signal output from the light detector 116 shown in FIG. 3. Further, the adder 266 outputs the electrical signal corresponding to the Y polarization component included in the polarization multiplexed optical signal to the polarization angle detector 204. The electrical signal output from the adder 266 corresponds to the electrical signal output from the light detector 117 shown in FIG. 3. The polarization angle detector 204 detects a rotation of the polarization plane of the polarization multiplexed light signal of the first wavelength propagated through the optical fiber 205 based on the electrical signal corresponding to the X polarization component output from the adder 265 and the electrical signal corresponding to the Y polarization component output from the adder 266.

The AD converters 260 to 263 correspond to the signal conversion units and convert analog electrical signals into digital signals. The AD converters 260 and 261 are AD converters corresponding to the X polarization component, and the AD converters 262 and 263 are AD converters corresponding to the Y polarization component. The AD converter 260 converts the electrical signal corresponding to the I component of the detection light of the X polarization output from the optical/electrical converter 256 into the digital signal. The AD converter 261 converts the electrical signal corresponding to the Q component of the detection light of the X polarization output from the optical/electrical converter 257 into the digital signal. The AD converter 262 converts the electrical signal corresponding to the I component of the detection light of the Y polarization output from the optical/electrical converter 258 into the digital signal. The AD converter 263 converts the electrical signal corresponding to the Q component of the detection light of the Y polarization output from the optical/electrical converter 259 into the digital signal.

The digital signal processing unit 264 performs a digital signal process on the digital signals output from the AD converters 260 to 263. The digital signal process performed in the digital signal processing unit 264 includes a polarization separation signal process. Further, the digital signal process performed in the digital signal processing unit 264 includes a process for reproducing the transmission data modulated at transmission source of the polarization multiplexed optical signal as reception data based on the input digital signal. The digital signal processing unit 264 may be configured, for example, using a DSP, an LSI, or the like.

It should be noted that the configuration of the second optical signal receiver 212 (refer to FIG. 7) are the same as the configuration of the first optical signal receiver 222 shown in FIG. 8. The second polarization angle detector 203 connected to the second optical signal receiver 212 detects a rotation of the polarization plane of the polarization multiplexed optical signal of the second wavelength propagated through the optical fiber 205 based on the electric signal corresponding to the X polarization component included in the polarization multiplexed optical signal and the electrical signal corresponding to the Y polarization component included in the polarization multiplexed optical signal, which are generated in the second optical signal receiver 212.

In the above description, an example is described in which the polarization angle detectors 203 and 204 detect the rotation of the polarization angle based on the electrical signals of the polarization components photoelectrically converted. However, the present disclosure is not limited thereto. The polarization angle detectors 203 and 204 may detect the rotation of the polarization angle based on the polarization angle calculated in the polarization separation signal process performed in the digital signal processing unit 264, instead of detecting the rotation of the polarization angle using the photoelectrically converted electrical signal.

Figure 9:
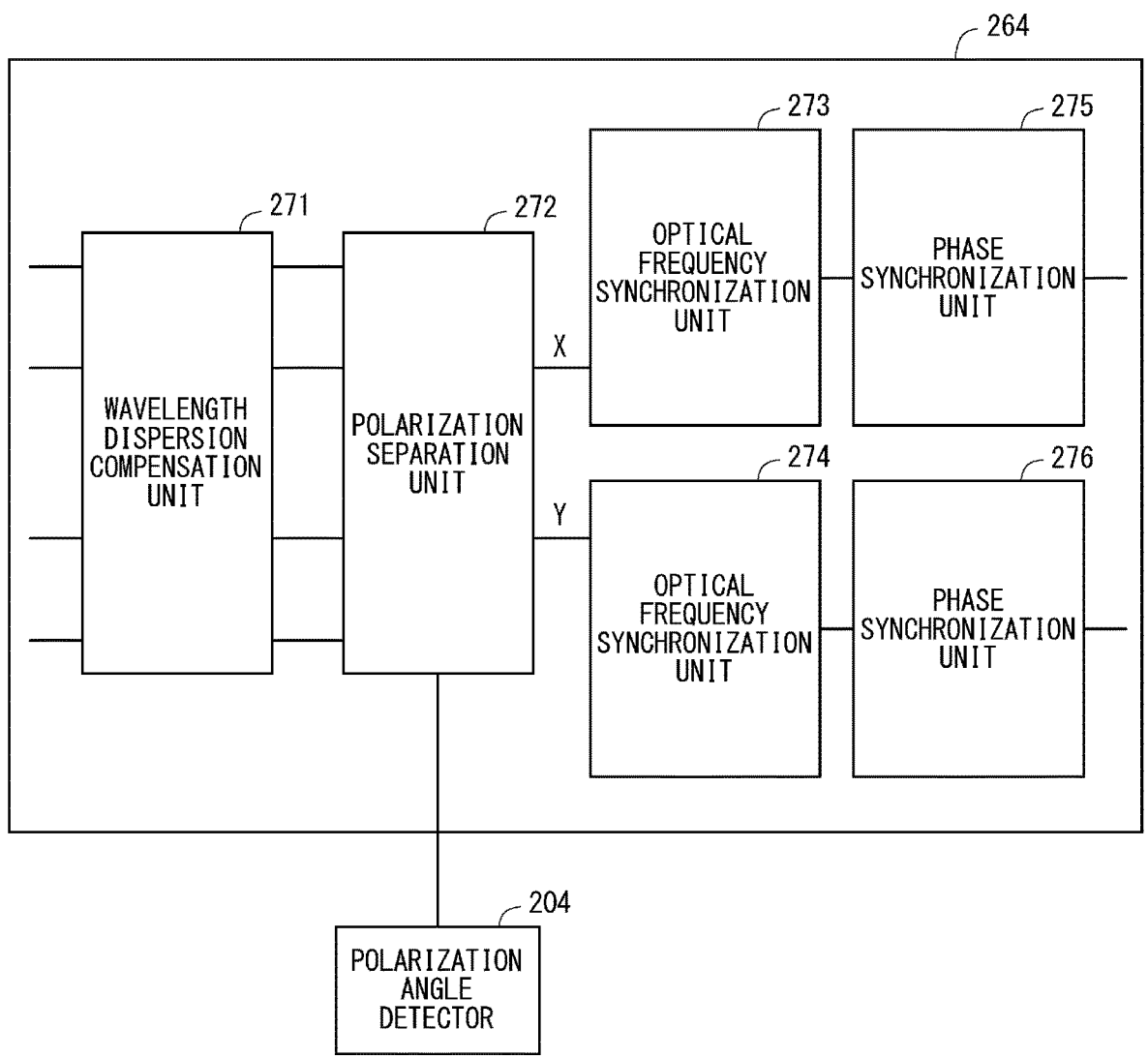
FIG. 9 is a block diagram showing a configuration of a digital signal processing unit.

FIG. 9 shows a configuration of the digital signal processing unit 264. The digital signal processing unit 264 includes a wavelength dispersion compensation unit 271, a polarization separation unit 272, optical frequency synchronization units 273 and 274, and phase synchronization units 275 and 276. The wavelength dispersion compensation unit 271 compensates the wavelength dispersion. The polarization separation unit 272 performs the polarization separation signal process. The polarization separation unit 272 separates two mutually orthogonal signals (polarization), for example, using a polarization separation digital signal process algorithm such as CMA (Constant Modulus Algorithm). The process performed by the polarization separation unit 272 includes calculation of the polarization angle. The polarization angle detector 204 detects the rotation of the polarization plane of the polarization multiplexed optical signal propagated through the optical fiber 205 based on the polarization angle calculated in the polarization separation unit 272.

Figure 10:
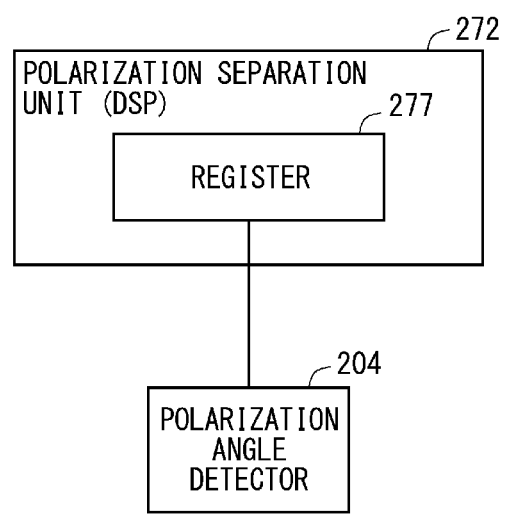
FIG. 10 is a block diagram showing a polarization separation unit and a polarization angle detector.

FIG. 10 shows the polarization separation unit 272 and the polarization angle detector 204. The polarization separation unit 272 (digital signal processing unit 264) includes, for example, a register 277 accessible from an external device. The polarization separation unit 272 writes the polarization angle calculated in the polarization separating signal process into the register 277. The polarization angle detector 204 accesses to the register 277 and acquires the polarization angle calculated in the polarization separation signal process. When such a configuration is adopted, by adding a register accessible from an external device to an existing digital signal processing unit, it is possible to use the digital signal processing unit for the optical fiber sensor.

Referring back to FIG. 9, the optical frequency synchronization unit 273 synchronizes the optical frequency with respect to the X polarization component. The phase synchronization unit 275 synchronizes the phase with respect to the X polarization components. The optical frequency synchronization unit 274 synchronizes the optical frequency with respect to the Y polarization component. The phase synchronization unit 275 synchronizes the phase with respect to the Y polarization components. Although not shown in FIG. 8, the digital signal processing unit 264 also performs the demodulation of the data modulated at transmission side based on the X polarization component and Y polarization component, the phases of which are synchronized.

In the present embodiment, the optical fiber 205 is used for the optical signal transmission system as well. In the present embodiment, for example, a portion of the plurality of channels in the optical signal transmission system can be used for the optical fiber sensor 200. In this case, it is not required to lay an optical fiber dedicated for the optical fiber sensor 200. Further, in the present embodiment, the optical signal transceivers 201 and 202 that are used for transmitting and receiving optical signals are used for the optical fiber sensor 200. In the present embodiment, for example, it is possible to detect at least one of the vibration and the displacement which has occurred in the optical fiber using an unused channel among the plurality of channels in the optical signal transmission system. In this case, while transmitting and receiving the optical signals, it is possible to detect at least one of the vibration and the displacement which has occurred in the optical fiber used for transmitting and receiving the optical signals.

Figure 11:
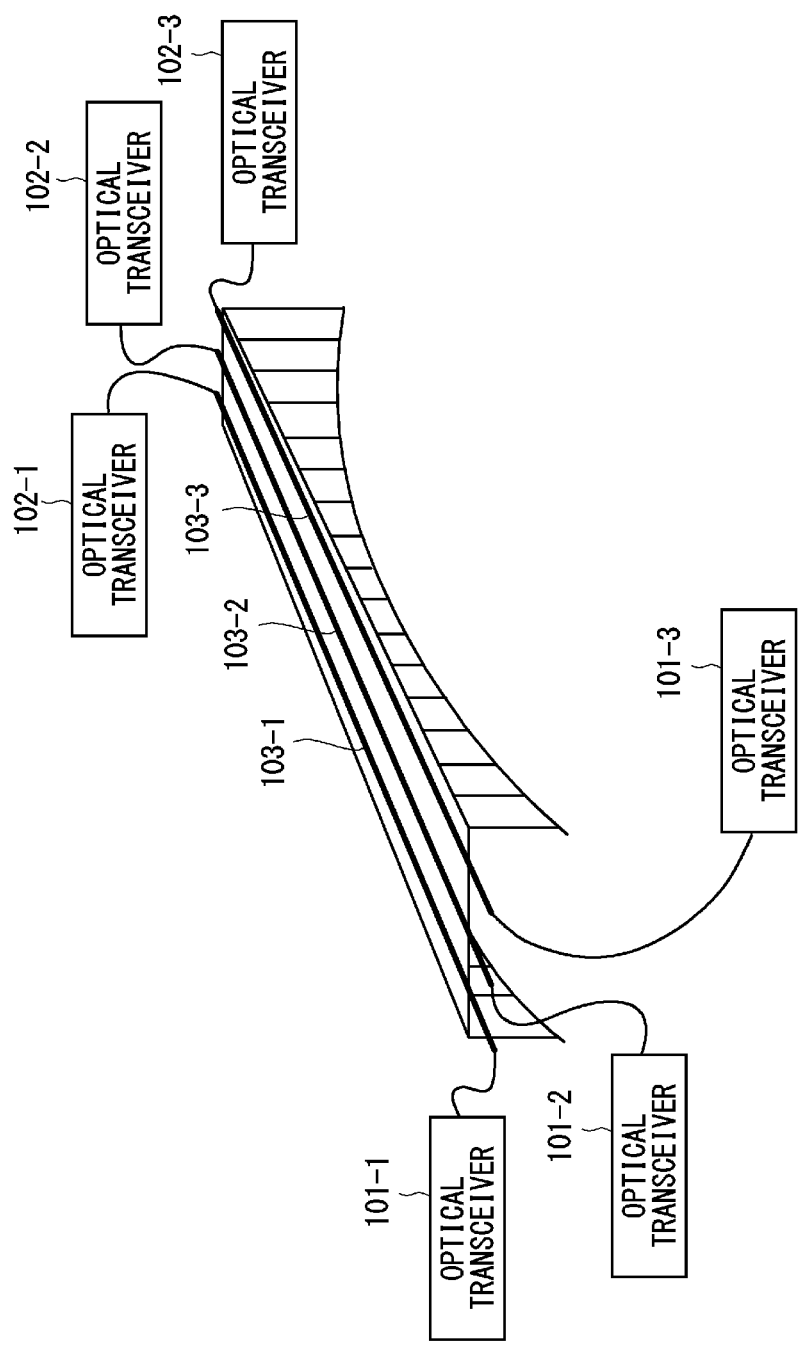
FIG. 11 is a diagram showing a first usage example of an optical fiber sensor system.

Hereinafter, usage examples of the optical fiber sensor system will be described. Firstly, a first usage example will be described. FIG. 11 shows a first usage example of the optical fiber sensor system. The first usage example is an example in which the optical fiber sensor is applied to a bridge. In the first usage example, three optical fibers 103-1 to 103-3 are laid on the bridge along a road. More specifically, the optical fiber 103-1 is laid at one end of the road passing through the bridge, the optical fiber 103-2 is laid at center of the road, and the optical fiber 103-3 is laid at the other end of the road. The first optical transceivers 101-1 to 101-3 are arranged at one end of the optical fibers 103-1 to 103-3, and the second optical transceivers 102-1 to 102-3 are arranged at the other end of the optical fibers.

It should be noted that, although not shown in FIG. 11, the first optical transceivers 101-1 to 101-3 are connected to the server 105 (refer to FIG. 2, etc.) via a network or the like, and the second optical transceivers 102-1 to 102-3 are connected to the server 106 via a network or the like. Further, in the server 104, not shown, at least one of the vibration and the displacement which has occurred in the optical fibers 103-1 to 103-3 is detected.

In the first usage example, for example, a vibration propagated to the optical fiber 103 when an automobile or the like passes through the road can be detected. Further, when the three optical fibers 103-1 to 103 are laid at different portion of the bridge (road) as shown in FIG. 11, it is possible to analyze whether the vibration or the displacement occurs only at either one end of the road or occurs on the whole road.

Figure 12:
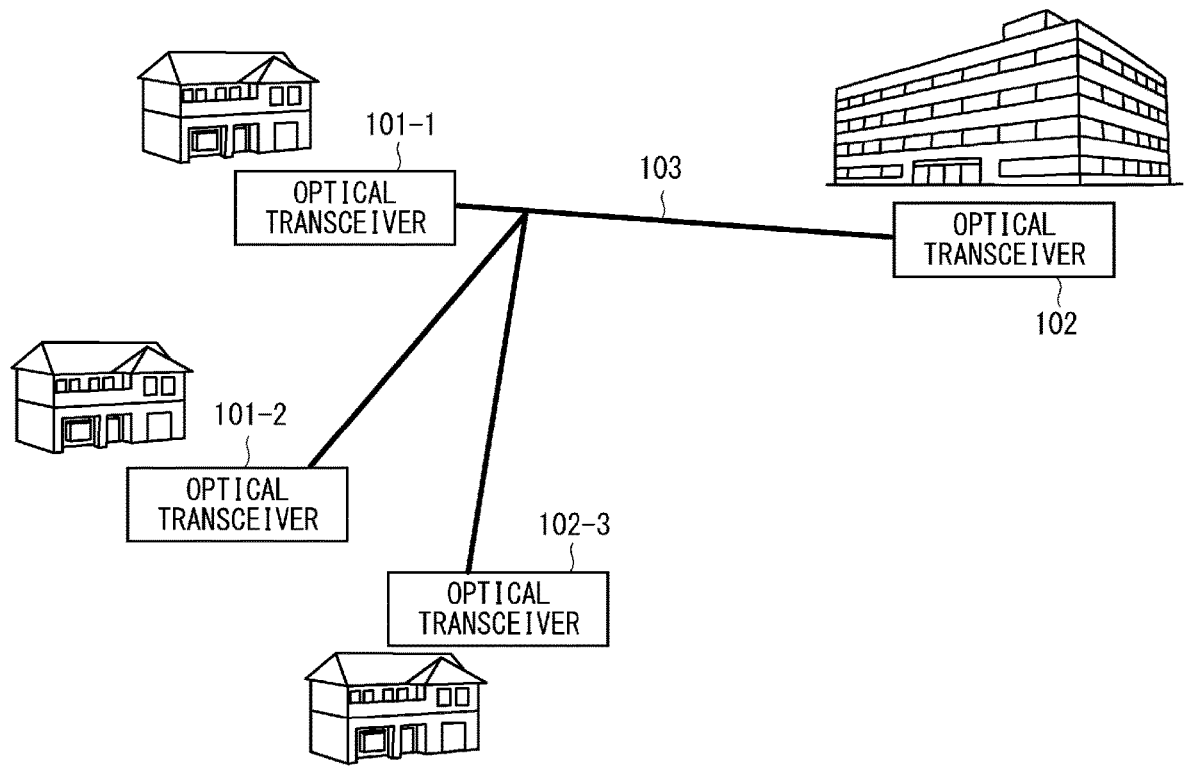
FIG. 12 is a diagram showing a second usage example of an optical fiber sensor system.

Next, a second usage example will be described. FIG. 12 shows a second usage example of the optical fiber sensor system. The second usage example is an example in which optical fibers between an accommodation station (relay station) and each house are used for the optical fiber sensor. The first optical transceivers 101-1 to 101-3 are arranged in each house, and the second optical transceiver 102 is arranged in the accommodation station. One end of the optical fiber 103 is branched to each house. The first optical transceiver 101 is arranged at each branched end of the optical fiber 103, and the second optical transceiver 102 is arrange at the other end of the optical fiber. Similar to the first usage example, the servers 104 to 106 are not shown in FIG. 12.

In the second usage example, for example, the vibration or displacement which has occurred in overhead lines including the optical fiber 103 and the like can be detected. Further, when an earthquake occurs, its quake can be detected using the optical fiber 103. In the second usage example, when an earthquake or the like occurs, it is possible to analyze the difference in quaking depending on the difference in location by detecting the vibration or displacement at each of optical fibers branched into a plurality of houses.

Figure 13:
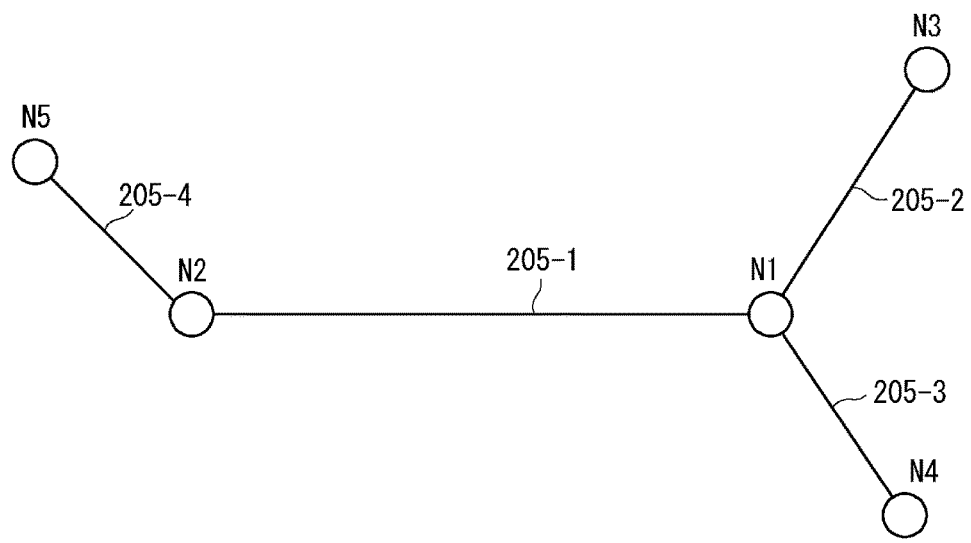
FIG. 13 is a diagram showing a third usage example of an optical fiber sensor system.

Next, a third usage example will be described. FIG. 13 shows a third usage example of the optical fiber sensor system. The third usage example is an example in which the optical fiber sensor system is applied to an optical signal transmission system. The optical signal transmission system includes a plurality of network nodes mutually connected by the optical fiber 205. The network node N1 and the network node N2 mutually transmit and receive optical signals through the optical fiber 205-1. The network node N1 and the network node N3 mutually transmit and receive optical signals through the optical fiber 205-2, and the network node N1 and network node N4 mutually transmit and receive optical signals through the optical fiber 205-3. Further, the network node N2 and network node N5 mutually transmit and receive optical signals through the optical fiber 205-4. The inter-node distance (length of the optical fiber between the nodes) exceeds, for example, several hundred kilometers.

The optical signal transmission system is configured as a system in which, for example, polarization multiplexed optical signals are transmitted and received using the digital coherent optical communication method. Each of the network nodes N1 to N5 transmit and receive the polarization multiplexed optical signals between the opposing other node via optical fiber 205. The optical signal transceiver 201 and the polarization angle detector 203 (refer to FIG. 7) are arranged at one end of each of the optical fibers 205-1 to 205-4 and the second optical signal transceiver 202 and the polarization angle detector 204 are arranged at the other end of the optical fibers, although these are now shown in FIG. 13. Similar to the first and second usage examples, the servers 104 to 106 are not shown in FIG. 13.

In the third usage example, the vibration or the displacement which has occurred in the optical fiber 205 connecting between the nodes can be detected. Further, when the vibration or the displacement is detected, it is possible to analyze whether the vibration or the displacement occurs in a specific areas or the vibration or the displacement occurs in whole areas.

It should be noted that, in each of the above described embodiments, an example in which the optical transmitter (optical signal transmitter) inputs a continuous wave light to the optical fiber constituting the optical fiber sensor has been described. However, the present disclosure is not limited thereto. The light output from the optical transmitter is not limited to a light with constant power. The optical transmitter may input, to the optical fiber, a light, the intensity of which changes with time. For example, when the fluctuation of the polarization plane is detected at the receiver side based on the ratio of the components of two polarization directions orthogonal to each other, the rotation of the polarization angle can be detected even if the light intensity is not constant at the transmitter side.

In the above described embodiments, some of the elements described as "means (unit)" or the like may be implemented as hardware, or may be implemented by causing a computer (CPU) to execute a voluntary program. Various programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), optical disc media (such as CD (Compact Disc) or DVD (digital versatile disk), semiconductor memories (such as Mask ROM (Read only Memory), PROM (Programmable ROM), EPROM (Erasable PROM), flash ROM, RAM (Random Access Memory). These programs may be provided to a computer using any type of transitory computer readable media. Examples of transitory computer readable media include electric signals, optical signals, and electromagnetic waves. Transitory computer readable media can be used to provide programs to a computer via a wired communication line (e.g., electric wires, and optical fibers) or a wireless communication line.

While the present disclosure has been described with reference to exemplary embodiments, the present disclosure should not be limited by the above described embodiments. Various modifications, which can be recognized within the scope of the present disclosure by those skilled in the art, may be made to configurations or details of the present disclosure.

For example, the whole or part of the embodiments disclosed above can be described as, but not limited to, the following supplementary notes.

(Supplementary Note 1)

An optical fiber sensor system comprising:

an optical fiber sensor including:

an optical fiber configured to change a polarization state of a propagating light when at least one of a vibration and a displacement occurs;

a first optical transmitter arranged at one end of the optical fiber and configured to input a first wavelength light to the optical fiber;

a first optical receiver arranged at other end of the optical fiber and configured to receive the first wavelength light propagated through the optical fiber in a first direction from the one end toward the other end;

a first polarization fluctuation detector configured to detect a fluctuation of a polarization of a light received by the first optical receiver;

a second optical transmitter arranged at the other end of the optical fiber and configured to input a second wavelength light to the optical fiber;

a second optical receiver arranged at the one end of the optical fiber and configured to receive the second wavelength light propagated through the optical fiber in a second direction opposite to the first direction;

a second polarization fluctuation detector configured to detect a fluctuation of a polarization of a light received by the second optical receiver;

a first separator arranged between the one end of the optical fiber and the first optical transmitter and the second optical receiver, and configured to input the first wavelength light output from the first optical transmitter to the optical fiber and to cause the second optical receiver to receive the second wavelength light propagated through the optical fiber in the second direction; and a second separator arranged between the other end of the optical fiber and the second optical transmitter and the first optical receiver, and configured to input the second wavelength light output from the second optical transmitter to the optical fiber and to cause the first optical receiver to receive the first wavelength light propagated through the optical fiber in the first direction, and a data processing device configured to collect a first polarization fluctuation data indicating a fluctuation of a polarization detected in the first polarization fluctuation detector and a second polarization fluctuation data indicating a fluctuation of a polarization detected in the second polarization fluctuation detector.

(Supplementary Note 2)

The optical fiber sensor system according to Supplementary note 1, wherein the first separator includes:

a first port connected to the one end of the optical fiber;

a second port connected to the first optical transmitter;

a third port connected to the second optical receiver; and a first wavelength multiplexer/demultiplexer configured to pass the first wavelength light from the second port to the first port and pass the second wavelength light from the first port to the third port, and wherein the second separator includes:

a fourth port connected to the other end of the optical fiber;

a fifth port connected to the second optical transmitter;

a sixth port connected to the first optical receiver; and a second wavelength multiplexer/demultiplexer configured to pass the first wavelength light from the fourth port to the sixth port and pass the second wavelength light from the fifth port to the fourth port.

(Supplementary Note 3)

The optical fiber sensor system according to Supplementary note 1 or 2, wherein the first optical receiver includes:

a first polarization component detector configured to detect a light component in a first polarization direction of the first wavelength light propagated through the optical fiber in the first direction; and a second polarization component detector configured to detect a light component in a second polarization direction orthogonal to the first polarization direction, and wherein the second optical receiver includes:

a third polarization component detector configured to detect a light component in a third polarization direction of the second wavelength light propagated through the optical fiber in the second direction; and a fourth polarization component detector configured to detect a light component in a fourth polarization direction orthogonal to the third polarization direction.

(Supplementary Note 4)

The optical fiber sensor system according to Supplementary note 3, wherein the first optical receiver further includes a first polarization separator configured to branch the light component in the first polarization direction in the first wavelength light propagated through the optical fiber to the first polarization component detector and branch the light component in the second polarization direction to the second polarization component detector, and wherein the second optical receiver further includes a second polarization separator configured to branch the light component in the third polarization direction in the second wavelength light propagated through the optical fiber to the third polarization component detector and branch the light component in the fourth polarization direction to the fourth polarization component detector.

(Supplementary Note 5)

The optical fiber sensor system according to Supplementary note 4, wherein the first polarization separator includes a first polarization beam splitter configured to transmit one of a light in the first polarization direction and a light in the second polarization direction and reflect other of the light in the first polarization direction and the light in the second polarization direction, and wherein the second polarization separator includes a second polarization beam splitter configured to transmit one of a light in the third polarization direction and a light in the fourth polarization direction and reflect other of the light in the third polarization direction and the light in the fourth polarization direction.

(Supplementary Note 6)

The optical fiber system according to any one of Supplementary notes 3 to 5, wherein the first polarization fluctuation detector includes a first polarization rotation detector configured to detect a rotation of a polarization plane in the first wavelength light propagated through the optical fiber based on the light component in the first polarization direction detected by the first polarization component detector and the light component in the second polarization direction detected by the second polarization detector, and wherein the second polarization fluctuation detector further includes a polarization rotation detector configured to detect a rotation of a polarization plane in the second wavelength light propagated through optical fiber based on the light component in the third polarization direction detected by the third polarization component detector and the light component in the fourth polarization direction detected by the fourth polarization component detector.

(Supplementary Note 7)

The optical fiber sensor system according to Supplementary note 6, wherein the first polarization rotation detector detects the rotation of the polarization plane based on a ratio of the detected light component in the first polarization direction to the detected light component in the second polarization direction, and wherein the second polarization rotation detector detects the rotation of the polarization plane based on a ratio of the detected light component in the third polarization direction to the detected light component in the fourth polarization direction.

(Supplementary Note 8)

The optical fiber sensor system according to any one of Supplementary notes 1 to 7, wherein the first optical transmitter includes a first light source configured to output a linearly polarized light and the second optical transmitter includes a second light source configured to output a linearly polarized light.

(Supplementary Note 9)

The optical fiber sensor system according to any one of Supplementary notes 1 to 8, wherein a plurality of the optical fiber sensors are provide therein.

(Supplementary Note 10)

The optical fiber sensor system according to any one of Supplementary notes 1 to 9, wherein the optical fiber further serves as an optical fiber used in an optical signal transmission system for transmitting and receiving optical signals.

(Supplementary Note 11)

The optical fiber sensor system according to Supplementary note 10, wherein a plurality of optical signal transceivers each configured to transmit and receive the optical signal are provided at both ends of the optical fiber, and wherein a portion of the plurality of the optical signal transceivers arranged at one end of the optical fiber is used as the first optical transmitter and the second optical receiver, and a portion of the plurality of the optical signal transceiver arranged at the other end of the optical fiber is used as the second optical transmitter and the first optical receiver.

(Supplementary Note 12)

The optical fiber sensor system according to Supplementary note 11, wherein the optical signal transmission system transmits and receives polarization multiplexed optical signals using a digital coherent optical communication system, and the optical signal transceiver includes a digital coherent optical receiver.

(Supplementary Note 13)

The optical fiber sensor system according to Supplementary note 12, wherein the digital coherent optical receiver arranged at the one end of the optical fiber is used as the second optical receiver, and the digital coherent optical receiver arranged at the other end of the optical fiber is used as the first optical receiver.

(Supplementary Note 14)

The optical fiber sensor system according to Supplementary note 13, wherein the digital coherent optical receiver includes: a polarization separation means for separating the polarization multiplexed optical signal into two polarization components orthogonal to each other; an optical/electrical conversion means for converting each of the separated polarization component into an electric signal; a signal conversion means for converting the converted electric signal of each of the polarization components into a digital signal; and a digital signal processing means for performing a predetermined process for the digital signal.

(Supplementary Note 15)

The optical fiber sensor system according to Supplementary note 14, wherein the polarization separation means and the optical/electrical conversion means are used as the first optical receiver and the second optical receiver.

(Supplementary Note 16)

The optical fiber sensor system according to Supplementary note 15, wherein the first polarization fluctuation detector and the second polarization fluctuation detector detect the fluctuation of the polarization based on the converted electric signal of each of the polarization components.

(Supplementary Note 17)

The optical fiber sensor system according to Supplementary note 15, wherein the signal process performed in the digital signal processing means includes a polarization separation signal process, and wherein the first polarization fluctuation detector and the second polarization fluctuation detector detect the fluctuation of the polarization based on an polarization angle calculated in the polarization separation signal process.

(Supplementary Note 18)

The optical fiber sensor system according to Supplementary note 17, wherein the digital signal processing means includes a register accessible from an external device and writes the polarization angle calculated in the polarization separating signal process into the register.

(Supplementary Note 19)

The optical fiber sensor system according to any one of Supplementary notes 10 to 18, wherein the optical signal transmission system transmits the optical signal in a plurality of channels using a wavelength division multiplexing system, and a portion of the plurality of the channels is used in the optical fiber sensor.

(Supplementary Note 20)

The optical fiber sensor system according to any one of Supplementary notes 1 to 19, wherein the data processing device includes a first data processing device configured to collect the first polarization fluctuation data from the first polarization fluctuation detector; a second data processing device configured to collect the second polarization fluctuation data from the second polarization fluctuation detector; and a third data processing device configured to collect the first polarization fluctuation data and the second polarization fluctuation data from the first data processing device and the second data processing device.

(Supplementary Note 21)

The optical fiber sensor system according to Supplementary note 20, wherein the first data processing device imparts a timestamp to the first polarization fluctuation data and the second data processing device imparts a timestamp to the second polarization fluctuation data.

(Supplementary Note 22)

The optical fiber sensor system according to any one of Supplementary notes 1 to 21, wherein the data processing device includes a position identification means for identifying a position at which at least one of the vibration and the displacement occurs in the optical fiber based on the first polarization fluctuation data and the second polarization fluctuation data.

(Supplementary Note 23)

An optical fiber sensor comprising:

an optical fiber configured to change a polarization state of a propagating light when at least one of a vibration and a displacement occurs;

a first optical transmitter arranged at one end of the optical fiber and configured to input a first wavelength light to the optical fiber;

a first optical receiver arranged at other end of the optical fiber and configured to receive the first wavelength light propagated through the optical fiber in a first direction from the one end toward the other end;

a first polarization fluctuation detector configured to detect a fluctuation of a polarization of a light received by the first optical receiver;

a second optical transmitter arranged at the other end of the optical fiber and configured to input a second wavelength light to the optical fiber;

a second optical receiver arranged at the one end of the optical fiber and configured to receive the second wavelength light propagated through the optical fiber in a second direction opposite to the first direction;

a second polarization fluctuation detector configured to detect a fluctuation of a polarization of a light received by the second optical receiver;

a first wavelength multiplexer/demultiplexer arranged between the one end of the optical fiber and the first optical transmitter and the second optical receiver, and configured to input the first wavelength light output from the first optical transmitter to the optical fiber and to cause the second optical receiver to receive the second wavelength light propagated through the optical fiber in the second direction;

a second wavelength multiplexer/demultiplexer arranged between the other end of the optical fiber and the second optical transmitter and the first optical receiver, and configured to input the second wavelength light output from the second optical transmitter to the optical fiber and to cause the first optical receiver to receive the first wavelength light propagated through the optical fiber in the first direction.

The present application is based upon and claims the benefit of priority from Japanese Patent Application No. 2016-080768, filed on Apr. 14, 2016, the entire contents of which are hereby incorporated by reference.

REFERENCE SIGNS LIST

10: OPTICAL FIBER SENSOR SYSTEM
21: OPTICAL FIBER SENSOR
11, 12: OPTICAL TRANSMITTER
13, 14: OPTICAL RECEIVER
15, 16: POLARIZATION FLUCTUATION DETECTOR
19: OPTICAL FIBER
21: OPTICAL FIBER SENSOR
22: DATA PROCESSING DEVICE
100: OPTICAL FIBER SENSOR SYSTEM
101: FIRST OPTICAL TRANSCEIVER
102: SECOND OPTICAL TRANSCEIVER
103: OPTICAL FIBER
104-106: SERVER
111: OPTICAL TRANSMITTER
112: OPTICAL RECEIVER
113: POLARIZATION ANGLE DETECTOR
114: WAVELENGTH MULTIPLEXER/DEMULTIPLEXER
116, 117: LIGHT DETECTOR
121: OPTICAL TRANSMITTER
122: OPTICAL RECEIVER
123: POLARIZATION ANGLE DETECTOR
124: WAVELENGTH MULTIPLEXER/DEMULTIPLEXER
141: DATA RECEPTION UNIT
142: VIBRATION/DISPLACEMENT DETECTION UNIT
143: POSITION IDENTIFICATION UNIT
151, 161: DATA COLLECTION UNIT
152, 162: TIMESTAMP IMPARTMENT UNIT
153, 163: DATA TRANSMISSION UNIT
200: OPTICAL FIBER SENSOR
201, 202: OPTICAL SIGNAL TRANSCEIVER
203, 204: POLARIZATION ANGLE DETECTOR
205: OPTICAL FIBER
211, 221: OPTICAL SIGNAL TRANSMITTER
212, 222: OPTICAL SIGNAL RECEIVER
251: POLARIZATION BEAM SPLITTER
252: ¼ WAVELENGTH PLATE
253, 254: OPTICAL MIXER
256-259: OPTICAL/ELECTRICAL CONVERTER
260-263: AD CONVERTER
264: DIGITAL SIGNAL PROCESSING UNIT
265, 266: ADDER
271: WAVELENGTH DISPERSION COMPENSATION UNIT
272: POLARIZATION SEPARATION UNIT
273, 274: OPTICAL FREQUENCY SYNCHRONIZATION UNIT
275, 276: PHASE SYNCHRONIZATION UNIT
277: REGISTER

The invention claimed is:

1. An optical fiber sensor system comprising:
an optical fiber sensor including:
   an optical fiber configured to change a polarization state of a propagating light when at least one of a vibration and a displacement occurs;
   a first optical transmitter arranged at one end of the optical fiber and configured to input a first wavelength light to the optical fiber;
   a first optical receiver arranged at other end of the optical fiber and configured to receive the first wavelength light propagated through the optical fiber in a first direction from the one end toward the other end;
   a first polarization fluctuation detector configured to detect a fluctuation of a polarization of a light received by the first optical receiver;
   a second optical transmitter arranged at the other end of the optical fiber and configured to input a second wavelength light to the optical fiber;
   a second optical receiver arranged at the one end of the optical fiber and configured to receive the second wavelength light propagated through the optical fiber in a second direction opposite to the first direction;
   a second polarization fluctuation detector configured to detect a fluctuation of a polarization of a light received by the second optical receiver;
   a first separator arranged between the one end of the optical fiber and the first optical transmitter and the second optical receiver, and configured to input the first wavelength light output from the first optical transmitter to the optical fiber and to cause the second optical receiver to receive the second wavelength light propagated through the optical fiber in the second direction; and a second separator arranged between the other end of the optical fiber and the second optical transmitter and the first optical receiver, and configured to input the second wavelength light output from the second optical transmitter to the optical fiber and to cause the first optical receiver to receive the first wavelength light propagated through the optical fiber in the first direction, and a data processing device configured to collect a first polarization fluctuation data indicating a fluctuation of a polarization detected in the first polarization fluctuation detector and a second polarization fluctuation data indicating a fluctuation of a polarization detected in the second polarization fluctuation detector.

2. The optical fiber sensor system according to claim 1, wherein the first separator includes:
a first port connected to the one end of the optical fiber;
a second port connected to the first optical transmitter;
a third port connected to the second optical receiver; and
a first wavelength multiplexer/demultiplexer configured to pass the first wavelength light from the second port to the first port and pass the second wavelength light from the first port to the third port,
and wherein the second separator includes:
a fourth port connected to the other end of the optical fiber;
a fifth port connected to the second optical transmitter;
a sixth port connected to the first optical receiver; and
a second wavelength multiplexer/demultiplexer configured to pass the first wavelength light from the fourth port to the sixth port and pass the second wavelength light from the fifth port to the fourth port.

3. The optical fiber sensor system according to claim 1, wherein the first optical receiver includes:
a first polarization component detector configured to detect a light component in a first polarization direction of the first wavelength light propagated through the optical fiber in the first direction; and
a second polarization component detector configured to detect a light component in a second polarization direction orthogonal to the first polarization direction,
and wherein the second optical receiver includes:
a third polarization component detector configured to detect a light component in a third polarization direction of the second wavelength light propagated through the optical fiber in the second direction; and
a fourth polarization component detector configured to detect a light component in a fourth polarization direction orthogonal to the third polarization direction.

4. The optical fiber sensor system according to claim 3, wherein the first optical receiver further includes a first polarization separator configured to branch the light component in the first polarization direction in the first wavelength light propagated through the optical fiber to the first polarization component detector and branch the light component in the second polarization direction to the second polarization component detector,
and wherein the second optical receiver further includes a second polarization separator configured to branch the light component in the third polarization direction in the second wavelength light propagated through the optical fiber to the third polarization component detector and branch the light component in the fourth polarization direction to the fourth polarization component detector.

5. The optical fiber sensor system according to claim 4, wherein the first polarization separator includes a first polarization beam splitter configured to transmit one of a light in the first polarization direction and a light in the second polarization direction and reflect other of the light in the first polarization direction and the light in the second polarization direction,
and wherein the second polarization separator includes a second polarization beam splitter configured to transmit one of a light in the third polarization direction and a light in the fourth polarization direction and reflect other of the light in the third polarization direction and the light in the fourth polarization direction.

6. The optical fiber system according to claim 3, wherein the first polarization fluctuation detector includes a first polarization rotation detector configured to detect a rotation of a polarization plane in the first wavelength light propagated through the optical fiber based on the light component in the first polarization direction detected by the first polarization component detector and the light component in the second polarization direction detected by the second polarization detector,
and wherein the second polarization fluctuation detector further includes a polarization rotation detector configured to detect a rotation of a polarization plane in the second wavelength light propagated through optical fiber based on the light component in the third polarization direction detected by the third polarization component detector and the light component in the fourth polarization direction detected by the fourth polarization component detector.

7. The optical fiber sensor system according to claim 1, wherein the optical fiber further serves as an optical fiber used in an optical signal transmission system for transmitting and receiving optical signals.

8. The optical fiber sensor system according to claim 7, wherein a plurality of optical signal transceivers each configured to transmit and receive the optical signal are provided at both ends of the optical fiber,
and wherein a portion of the plurality of the optical signal transceivers arranged at one end of the optical fiber is used as the first optical transmitter and the second optical receiver, and a portion of the plurality of the optical signal transceiver arranged at the other end of the optical fiber is used as the second optical transmitter and the first optical receiver.

9. The optical fiber sensor system according to claim 8, wherein the optical signal transmission system transmits and receives polarization multiplexed optical signals using a digital coherent optical communication system, and the optical signal transceiver includes a digital coherent optical receiver.

10. The optical fiber sensor system according to claim 9, wherein the digital coherent optical receiver arranged at the one end of the optical fiber is used as the second optical receiver, and the digital coherent optical receiver arranged at the other end of the optical fiber is used as the first optical receiver.

11. The optical fiber sensor system according to claim 10, wherein the digital coherent optical receiver includes: a polarization separator configured to separate the polarization multiplexed optical signal into two polarization components orthogonal to each other; an optical/electrical converter configured to convert each of the separated polarization component into an electric signal; a signal converter configured to convert the converted electric signal of each of the polarization components into a digital signal; and a digital signal processor configured to perform a predetermined process for the digital signal.

12. The optical fiber sensor system according to claim 11, wherein the polarization separator and the optical/electrical converter are used as the first optical receiver and the second optical receiver.

13. The optical fiber sensor system according to claim 12, wherein the first polarization fluctuation detector and the second polarization fluctuation detector detect the fluctuation of the polarization based on the converted electric signal of each of the polarization components.

14. The optical fiber sensor system according to claim 12, wherein the signal process performed in the digital signal processor includes a polarization separation signal process, and wherein the first polarization fluctuation detector and the second polarization fluctuation detector detect the fluctuation of the polarization based on an polarization angle calculated in the polarization separation signal process.

15. The optical fiber sensor system according to claim 14, wherein the digital signal processor includes a register accessible from an external device and writes the polarization angle calculated in the polarization separating signal process into the register.

16. The optical fiber sensor system according to claim 7, wherein the optical signal transmission system transmits the optical signal in a plurality of channels using a wavelength division multiplexing system, and a portion of the plurality of the channels is used in the optical fiber sensor.

17. The optical fiber sensor system according to claim 1, wherein the data processing device includes a first data processing device configured to collect the first polarization fluctuation data from the first polarization fluctuation detector; a second data processing device configured to collect the second polarization fluctuation data from the second polarization fluctuation detector; and a third data processing device configured to collect the first polarization fluctuation data and the second polarization fluctuation data from the first data processing device and the second data processing device.

18. The optical fiber sensor system according to claim 17, wherein the first data processing device imparts a timestamp to the first polarization fluctuation data and the second data processing device imparts a timestamp to the second polarization fluctuation data.

19. The optical fiber sensor system according to claim 1, wherein the data processing device includes a position identification unit configured to identify a position at which at least one of the vibration and the displacement occurs in the optical fiber based on the first polarization fluctuation data and the second polarization fluctuation data.

20. An optical fiber sensor comprising:
an optical fiber configured to change a polarization state of a propagating light when at least one of a vibration and a displacement occurs;
a first optical transmitter arranged at one end of the optical fiber and configured to input a first wavelength light to the optical fiber;
a first optical receiver arranged at other end of the optical fiber and configured to receive the first wavelength light propagated through the optical fiber in a first direction from the one end toward the other end;
a first polarization fluctuation detector configured to detect a fluctuation of a polarization of a light received by the first optical receiver;
a second optical transmitter arranged at the other end of the optical fiber and configured to input a second wavelength light to the optical fiber;
a second optical receiver arranged at the one end of the optical fiber and configured to receive the second wavelength light propagated through the optical fiber in a second direction opposite to the first direction;
a second polarization fluctuation detector configured to detect a fluctuation of a polarization of a light received by the second optical receiver;
a first wavelength multiplexer/demultiplexer arranged between the one end of the optical fiber and the first optical transmitter and the second optical receiver, and configured to input the first wavelength light output from the first optical transmitter to the optical fiber and to cause the second optical receiver to receive the second wavelength light propagated through the optical fiber in the second direction;
a second wavelength multiplexer/demultiplexer arranged between the other end of the optical fiber and the second optical transmitter and the first optical receiver, and configured to input the second wavelength light output from the second optical transmitter to the optical fiber and to cause the first optical receiver to receive the first wavelength light propagated through the optical fiber in the first direction.

* * * * *